(12) United States Patent
Lavine et al.

(10) Patent No.: US 11,797,698 B2
(45) Date of Patent: Oct. 24, 2023

(54) DECENTRALIZED CONSENT NETWORK FOR DECOUPLING THE STORAGE OF PERSONALLY IDENTIFIABLE USER DATA FROM USER PROFILING DATA

(71) Applicant: CONCORD TECHNOLOGIES INC., Portland, OR (US)

(72) Inventors: Dashiell Lavine, Portland, OR (US); Paul Lawbaugh, Hillsboro, OR (US); Cian Montgomery, Portland, OR (US)

(73) Assignee: Concord Technologies Inc., Portland, OR (US)

( * ) Notice: Subject to any disclaimer, the term of this patent is extended or adjusted under 35 U.S.C. 154(b) by 393 days.

(21) Appl. No.: 16/901,507

(22) Filed: Jun. 15, 2020

(65) Prior Publication Data

US 2021/0390196 A1  Dec. 16, 2021

(51) Int. Cl.
| | | |
|---|---|---|
| *G06F 21/62* | (2013.01) | |
| *G06F 21/60* | (2013.01) | |
| *H04L 9/06* | (2006.01) | |
| *H04L 9/40* | (2022.01) | |
| *H04L 9/00* | (2022.01) | |

(52) U.S. Cl.
CPC ........ *G06F 21/6218* (2013.01); *G06F 21/604* (2013.01); *H04L 9/0643* (2013.01); *H04L 63/102* (2013.01); *G06F 2221/2141* (2013.01); *H04L 9/50* (2022.05)

(58) Field of Classification Search
CPC .............. G06F 21/6218; G06F 21/604; G06F 2221/2141; H04L 9/0643; H04L 63/102; H04L 9/50
See application file for complete search history.

(56) References Cited

U.S. PATENT DOCUMENTS

| | | | |
|---|---|---|---|
| 5,855,008 A | 12/1998 | Goldhaber | |
| 8,893,297 B2 | 11/2014 | Eversoll | |
| 9,104,858 B1* | 8/2015 | Sundaram | H04L 63/083 |
| 11,049,148 B2* | 6/2021 | Lawbaugh | H04L 9/0637 |
| 11,315,150 B2* | 4/2022 | Blaikie, III | G06Q 30/0269 |
| 2012/0323794 A1* | 12/2012 | Livshits | G06Q 30/02 |
| | | | 705/7.32 |

(Continued)

OTHER PUBLICATIONS

"Build a Better Internet: Let's Start This Journey. Together", Thrive, The Premium Decentralized Ad Marketplace, ico.thrivelabes.io, printed from https://ico.thrivelabs.io/documents/thrive_onepager.pdf, copyright 2017, 2 pages.

(Continued)

*Primary Examiner* — Jason Chiang
(74) *Attorney, Agent, or Firm* — Sheppard Mullin Richter & Hampton LLP

(57) ABSTRACT

A computer implemented method for tracking and securing user data, the method including providing a user data vault that stores user data, providing the user data to display on a user interface, collecting access rights and permission settings, storing the access rights on a blockchain consent network, and providing access to remote users. The system and methods utilize blockchain technology, encryption, and a novel data structure (e.g. consent tokens) that enhance the security, transparency, and user experience regarding user data collection.

20 Claims, 18 Drawing Sheets

(56) References Cited

U.S. PATENT DOCUMENTS

| | | | | |
|---|---|---|---|---|
| 2013/0298247 | A1* | 11/2013 | Laurila | G06F 21/6245 |
| | | | | 726/26 |
| 2014/0081844 | A1* | 3/2014 | Hosp | G06Q 20/4015 |
| | | | | 705/39 |
| 2017/0140408 | A1 | 5/2017 | Wuehler | |
| 2017/0195747 | A1 | 7/2017 | Haberman | |
| 2018/0053200 | A1* | 2/2018 | Cronin | G16H 20/30 |
| 2019/0019208 | A1* | 1/2019 | Postrel | G06Q 50/01 |
| 2019/0173854 | A1* | 6/2019 | Beck | H04L 63/123 |
| 2019/0238525 | A1 | 8/2019 | Padmanabhan | |
| 2019/0305938 | A1* | 10/2019 | Sandberg-Maitland | |
| | | | | H04L 9/0897 |
| 2019/0349343 | A1* | 11/2019 | Gollogly | H04L 9/50 |
| 2019/0361917 | A1* | 11/2019 | Tran | G06Q 20/308 |
| 2020/0005284 | A1* | 1/2020 | Vijayan | H04L 63/08 |
| 2020/0074102 | A1* | 3/2020 | Pitti | H04L 9/3239 |
| 2020/0082025 | A1* | 3/2020 | Zhou | H04L 9/3239 |
| 2020/0089895 | A1* | 3/2020 | Gollogly | G06F 21/602 |
| 2020/0160319 | A1* | 5/2020 | Smith | H04L 9/0637 |
| 2020/0202989 | A1* | 6/2020 | Dror | G06F 21/6245 |
| 2020/0211409 | A1* | 7/2020 | Latorre | H04L 9/0861 |
| 2020/0226285 | A1* | 7/2020 | Bulleit | G16H 40/67 |
| 2020/0250295 | A1* | 8/2020 | Padmanabhan | G06F 21/64 |
| 2020/0302482 | A1* | 9/2020 | Shakespeare | H04W 12/08 |
| 2020/0344233 | A1* | 10/2020 | Lai | G06Q 20/4014 |
| 2020/0394327 | A1* | 12/2020 | Childress | G06F 16/1824 |
| 2021/0141913 | A1* | 5/2021 | Mosconi | G06F 21/6245 |
| 2021/0201327 | A1* | 7/2021 | Konig | H04M 3/5191 |
| 2021/0271662 | A1* | 9/2021 | Muse | H04L 63/08 |

OTHER PUBLICATIONS

"Thrive Whitepaper V11.0", Thrive, The Premium Decentralized Ad Marketplace, ico.thrivelabs.io, printed from https://ico.thrivelabs.io/documents/thrive_whitepaper.pdf, copyright 2017, 43 pages.

"Thrive", Thrive, The Premium Decentralized Ad Marketplace, ico.thrivelabes.io, printed from https://ico.thrivelabs.io/documents/thrive_pitch_deck.pdf, copyright 2017, 12 pages.

Shrestha et al., "User-Controlled Privacy-Preserving User Profile Data Sharing Based on Blockchain", Future Technologies Conference (FTC), Nov. 2017 (Year: 2017), 10 pages.

Shrestha et al., "Blockchain-Based Research Data Sharing Framework for Incentivizing the Data Owners", International Conference on Blockchain, University of Saskatchewan, Jun. 22, 2018 (Year: 2018), pp. 259-266.

* cited by examiner

FIG. 10C

DECENTRALIZED CONSENT NETWORK FOR DECOUPLING THE STORAGE OF PERSONALLY IDENTIFIABLE USER DATA FROM USER PROFILING DATA

BACKGROUND

The modern almost ubiquitous use of internet technology, including e-commerce, social media, and other online services, has made it increasingly difficult for users to easily and effectively control the privacy of their own data. For example, many of the conventional tools used to ensure regulatory compliance with respect to user control over their data require users to log into each of their online service accounts and manually navigate and control a multitude of different data settings and preferences, which can be unduly cumbersome. Further, conventional technologies for electronic data collection, storage, and use compromise the security and privacy of users; create potential issues for users that might not wish to be identified and tracked; and/or fail to provide transparency as to how and by what entities users' data is being used. Technical solutions to these and other technical problems associated with online user data privacy and control are described herein.

SUMMARY

One aspect of the disclosure relates to a computer network architecture comprising: a decentralized consent network in which two or more different types of user data for a given user (e.g., user identity information and user profiling data) may be separately stored in one or more databases (e.g., in different data vaults) with a user controllable system linkage therebetween stored in the network; one or more applications comprising user interface module(s) that provide options for the user to manage data control settings, including providing the user with the capability to consent to one or more third parties accessing user selected portions of the user data according to user-selected data consent parameters; and a storage system (e.g., including a blockchain network) for storing a record of consent events (e.g., the granting, modifying, or revoking of a consent). The decentralized consent network is configured to issue, update, and/or decline consent to third party data access requests for some or all of the user data based on the user's data consent parameters.

When a user specifies data consent parameters for permission, modification, or revocation of consent for one or more third parties to access certain user data, the system stores a record of that consent event (e.g., stores a corresponding consent token to a blockchain) that indicates that a user has consented to, modified, or revoked the consent to use certain data in accordance with the user-specified data consent parameters. Granting and revoking of consent via the consent network may be applied to data outside of a user data vault, e.g., data stored in-house by an enterprise.

Third parties can use the decentralized consent network according to a variety of use cases described herein. According to one use case, when a third party desires to access some or all of the user's data, the consent network may determine if the access request is consistent with user-specified data consent parameters. The consent network determination may be implemented via one or more smart contracts that access the consent token, read the data consent parameters associated with that token, compare those parameters to the access request parameters, and grant or deny access based thereon and/or perform other actions based on the conditional logic of the smart contract(s).

In some cases, the consent network may inform the user that a data access request has been made. For each data access request made by a third party, the system may store a record of the access request (e.g., store a corresponding access token to the blockchain), the consent network determination, and/or any access resulting therefrom. This consent network approach may be used to create an immutable, auditable record of the consent events (including consents granted, modified, or revoked by a user), the data access requests by third parties, the network determinations, data accesses, and/or other network activity.

One or more user interface module(s) may provide options for third parties (e.g., brands, online services, and other third parties) to present options for users to provide consent for the third party to use certain user data and to control and manage other aspects of their data usage (e.g., a data vault, sharing status and controls, consent history, privacy score, a data vault score, rewards information, compliance actions, and other features). By using the decentralized consent network, a user can control its own data for individual or multiple third parties (e.g., online services, brands, etc.), via a single platform, without having to log into or otherwise access each of the third party sites.

The data consent parameters may be represented in data of a consent token recorded on a blockchain. The data consent parameters can include a variety of attributes. By way of example, the attributes may include, some or all of the following and/or other attributes: the entity or set of entities to which a consent applies; the type(s) of data, categories, or other subsets of a data type (at various levels of user-controlled granularity); a time frame (e.g., the consent effective date/time and expiration) for the consent; geographic restrictions; one or more user identifiers, device identifiers, and/or other identifiers to be linked; and other data consent parameters. The granularity with which consents may be given, modified, and revoked may be implemented at various levels. Thus, a user may grant consent for a third party to access one data type (e.g., profiling data) without necessarily providing access to other data types (e.g., user identity data). Additionally a user may consent to only certain categories of a type of data (e.g., specific categories of profiling data) being accessible to a given third party and/or subsets thereof. The data may include data input by the user, data collected based on user activity, data collected based on user device activity, or other data.

The system may assign an enrolled user various different identifiers, including a user identifier (e.g., wallet ID); separate device identifiers for each device that the user registers with the system; user browser identifiers for different browsers used by the user; and/or other identifiers associated with the user, the user's devices, or other user-related criteria. The user identifier(s) may be used internally by the system (and/or externally) to identify a user or device (but without necessarily identifying the actual identity of the user) and may link various user data to one or more identifiers in accordance with the user consent parameters.

For example, a user may not want to share a first type of data (e.g., user identity data) but may be willing to selectively share a second type of data (e.g., user profiling data or portions thereof) on an anonymous basis. The user may create data consent parameters for this and the system will create a link between the user identity data and the anonymized data in accordance with the data consent parameters. This anonymized profiling data is only linked to a personally identifiable data type of the user if the user permits it. The system coordinates and stores a linkage between data types based on the data consent parameters selected by the user via the user interfaces. The system may store links or associations between different data types, including the user identifier data; the device identifier(s) data; and/or the anonymized identifier(s) for different types and/or categories of non-identifying data.

Revocation of a consent will result in removal of the corresponding link(s). Removal of a link will remove an ability to associate a first data type (e.g., a user or a device identifier) with a second user data type (e.g., anonymous profiling data). A user may permanently remove the link, making the user's profiling data irreversibly anonymized. In some instances, a grant may be revoked by writing a new entry in the blockchain, and the existence of this revocation may cause any links to anonymized profiling data records to be ignored.

The system may use a separate identifier for the different data types (e.g., user identity information, user devices and user profile data), anonymize one or more of the data types (e.g., user profile data) and create and manage a linkage between data types in accordance with the data consent parameters. The system may utilize a separate identifier for the anonymized profiling data of the user such that third parties (e.g., advertisers or marketers) need not obtain the user's personally identifying information in order to target the anonymized profiling data. Rather, the system coordinates the linkage between targeted anonymized profiling data and the user's personally identifiable data (e.g., device ID, email address, social media account details, cookies, or other identifiers). From the advertiser's or marketer's perspective, the anonymized profiling data (if permission is granted by the controlling end user) is available to be targeted and contains a rich data set for doing so, but without containing any personally identifiable information. This permits the advertising or marketing users to target users with fine granularity, but without overstepping privacy permissions granted at the controlling user level.

One or more user interfaces (UIs) may be presented to a user via a computer display and provide tools for the user to control the use of the user's personal data or otherwise interact with the decentralized consent network. The UIs may include a user dashboard, data vault access, tools to control access to data, a rewards tab and/or other functionality. Some of the UIs may be accessed via a web-based dashboard or mobile application; via partner websites, for example, that present a privacy and rewards tab (or other indicator); a combination of these; or via any other suitable mechanism.

The system may utilize various data store types, such as a decentralized database system (e.g., an interplanetary file system (IPFS); a distributed ledger such as a public or private blockchain; and/or a combination of these or other data store types). In one example, data that is to be securely stored, such as a user's personally identifiable information, a link between the user's ID and the anonymized data, and even the anonymized profiling data itself, may be stored in one or more secure databases or data vaults, which may be part of a distributed database system or a private blockchain. Data that is to be generally available (e.g., a reward amount granted for using anonymized data, ad parameters, and/or reporting data) may be stored in a publicly or generally accessible location, such as a public blockchain. Various types of data can be selectively stored by users in the data vault. This data may include data that permits use of an identity, such as single sign on (SSO), a self-sovereign identity, a set of proofs or certified claims, consent data, or the like.

The decentralized consent network may comprise one or more blockchains, including a private blockchain and/or more or more public blockchains. The system may write data regarding consent events to a blockchain block that can be consulted to determine if the user's data can be used for the proposed purpose. The block may be located using an anonymized record identifier that may be specified by a third party such as an advertiser or external CRM system. In this manner, the block may be later consulted to identify whether the user's data (e.g., anonymous profiling data record) may be used at all, may be used to target the user's device(s), may be used to target the user specifically, and so forth.

Optionally, at least a portion of usage of user data may be tracked and made transparent within the public domain. Users are incentivized to share data in order to improve the user experience. For example, users may be incentivized to share data via participation in a reward system. The tracking system permits auditing of the details regarding the advertising or promoted content. Furthermore, the tracking system facilitates transparency in terms of identifying the source of advertisements or promoted content, as well as the use and amount of rewards generated by interacting with such content. For example, upon the usage of user data with the user's consent, a transparent record is recorded in which those wishing to advertise or promote content place certain details in the public domain such as an identifier, timestamp, location posted, etc.

As an incentive to share their valuable data, the decentralized consent network includes mechanisms for managing rewards whereby users are rewarded for permitting use of their personal data stored in the data vault and/or other activities. The rewards may be provided in the form of discounts, promotions, or cryptocurrency or monetary compensation. One or more smart contracts may be used to facilitate the granting of rewards, including an associated transfer of value (e.g., points, tokens, cryptocurrency or other reward) in view of the consent given, store and report the reward grant, and confirm the consent for the reward grantor to use the data.

The amount of value placed on the data may be reflected in a user data vault score. The score may be calculated in a variety of ways. For example, the score may be keyed to the data in the data vault, the value to a brand partner, and so forth. The score may be associated with the aggregate value of data that a user shares. For example, aggregate demographic information of a user (e.g., age, sex, location, race, etc.) may be valued greater than the sum of each single demographic field. The reward system is designed to incentivize the sharing of data and improve the experience of users participating in the system. Users may be prompted, advised, or otherwise given the option to add certain types of data or to modify other data consent parameters to increase their score.

According to another aspect of the decentralized consent network, a set of third party user interfaces may be provided to enable third parties that desire to access and/or use user data to notify, prompt, and/or reward users in an effort to incentivize users to grant consent to make certain data available to the third party. According to some embodiments, a third party website may include an interface that presents a data tab which may link to the decentralized consent network (or an associated interface) to enable a user to specify permissions for the third party via the decentralized consent network, participate in rewards, or otherwise interact as described herein. This implementation on a third party site can be enabled via an Application Programming Interface (API) or code in the web site that interfaces with the decentralized consent network.

By way of example, the third party interface may be associated with a brand. The brand interface may be presented to a user via the decentralized consent network (not the brand's own website). As an example, the brand interface may include various display components, including for example, a Data Vault component, a sharing status and controls component, a consent history component, a rewards points component, a rewards component, and a compliance actions component. The brand interface may present the data parameters, but not the data itself.

The system ensures that user's data is shared in a manner that is efficient and in compliance with a user's consent. The system enables a single interface that integrates with multiple entities that utilize customer data. Companies can abide by user consent in an automated process created by the company which may also interface with the businesses existing information technologies and databases (e.g., sales and marketing databases and tools). This allows the end user to manage the permissions and consent to their own information without needing to directly use interfaces specific to each individual company and can expect each such company to reflect the user's consent quickly. Companies gain automated compliance to consent, useful for complying with various local, state, or federal regulatory requirements, without having to build new experiences to do so, which are often expensive to maintain. Companies also gain access to accurate, up-to-date, information on their customers such as changing interests, purchase intent, or personally identifiable information details. The consent network gives organizations an immutable audit trail of consent, necessary for proof of consent, and it provides the current validated state of consent at any time in the future. It can be applied to existing data or new data, internal or externally stored. For each consent event, the consent token issued acts as the indicator of ongoing consent.

The decentralized consent network can provide other services including a data notary service that will allow data fingerprints (e.g., hashes) from user wallet data vaults to be recorded on the blockchain as proof that the data in the wallet has not be altered. This can be used as proof to the system or any of its users of the integrity of the user identity data and other data stored in the user wallet. For example, a user can update data that is stored in its data vault, including for example, permission data (consent, revoke), compliance data, status data, contact data, etc., and these changes can be forwarded to or discovered by the appropriate parties, e.g., via linking the consent token. Allowing users to update their data in the data vault, with changes recorded on a blockchain or other decentralized authority, permits databases to be updated in a decentralized and remote fashion.

According to another use, the decentralized consent network may pass permitted data into an enterprise system. This permits the enterprise system to supplement or add to its existing data for use in marketing, advertising, or other purposes. This has a further benefit in that the user data passed to the enterprise system will be associated with a consent token, allowing the enterprise to easily confirm that is permitted to use such data explicitly by the user. The user is likewise able to control the use of this data by the enterprise by having the ability to revoke the validity of the consent token or update data associated with it. Revoking consent invalidates the consent token that is in possession of the business allowing the business to be quickly, and automatically, notified that the business no longer has consent to access the data, even if it is stored internally in a database.

The decentralized consent network can be used to issue consent grants for a wide variety of applications, not just for managing access to data vault information. By way of example, a business may use a person's social handle based on permission granted for them to do so at a promotional, in-person, event at a trade show, for example. The business generates a consent record so that, when the owner of the social handle opens their data vault, she sees the consent event for the business to use her social handle, even though the social handle itself may not be in her data vault. She may still have the option to change her consent from within her data vault.

Individuals need not register or sign up for the service before consent events are captured. Through a system of identity validation, any previous consent events already generated by any organizations may be captured in the network and the individual will be able to see her previous history at any time in the future. The requirements of identity validation can vary depending on the needs of the organization using the consent network, but it typically uses a combination of email, mobile, issued ID, and/or multi-factor identification. At this point, any historical events that correspond to any of the validated ID attributes will be displayed to the end user and consent options will be available, which may include consent events from several or many different organizations.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 10C illustrates example content displayed as part of a dashboard of an enterprise brand user interface, in accordance with embodiments disclosed herein.

Figure 1:
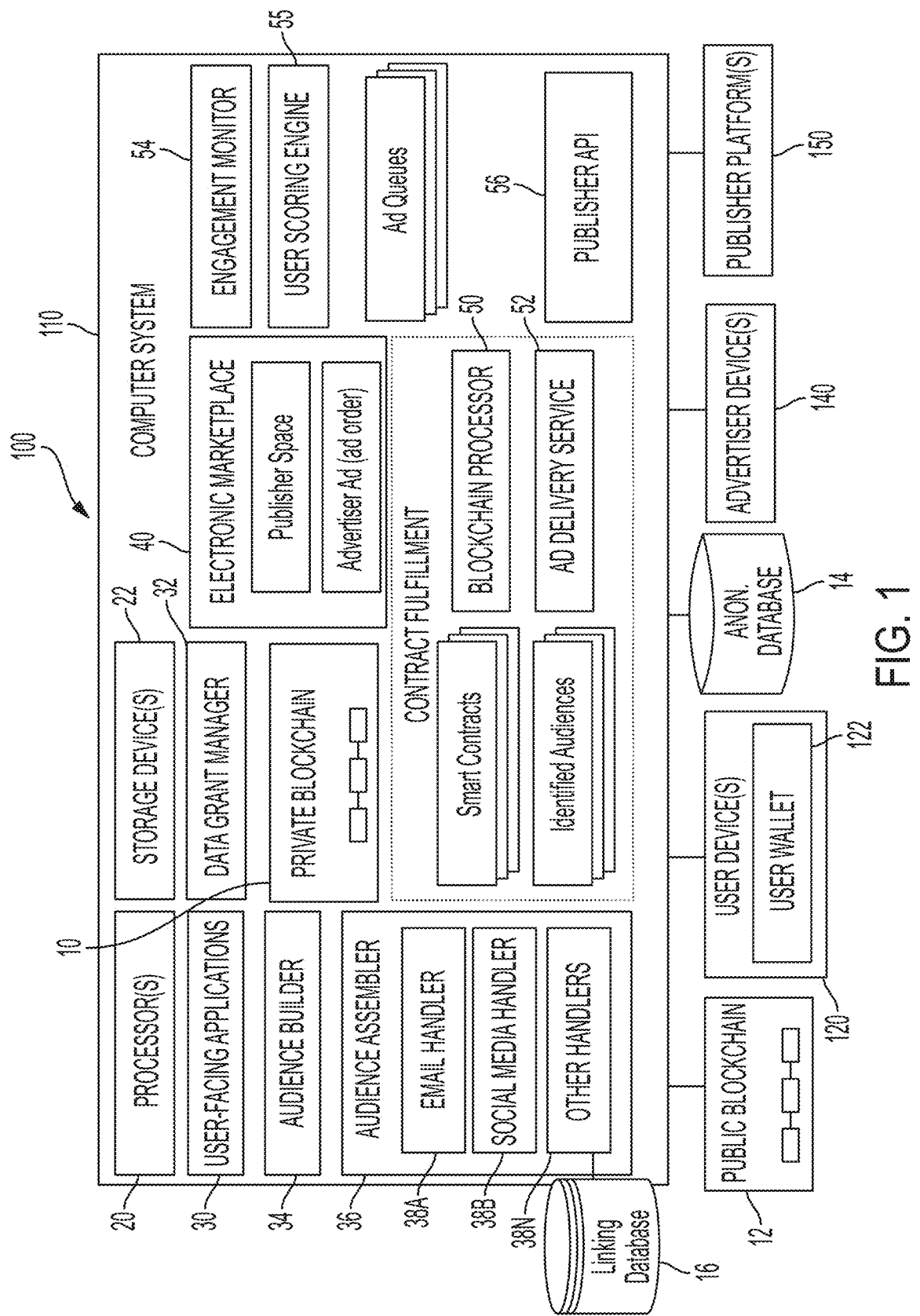
FIG. 1 is an example system architecture for tracking and securing user data, in accordance with the embodiments disclosed herein.

The figures are not illustrative only and do not limit the present disclosure to the precise form depicted.

DETAILED DESCRIPTION

The present disclosure provides technological solutions to technical problems relating to user privacy and transparency of use of user data that are associated with conventional approaches for user data collection Conventional technologies utilized for electronic data collection, storage, and use have compromised the security and privacy of users. It is currently common to use an identifier, such as a device-unique identifier, to identify a user's activities and associate those activities with the user's company ID in order to build a profile for the user such that online advertisements can be targeted to the user's segment. Many businesses rely on data-driven marketing, a practice that utilizes data, often personal and user-specific, to optimize marketing dollars and increase customer acquisition. This practice has resulted in a market where the collection and use of such information is a large and increasingly regulated industry, where the players are sometimes called "data brokers." Any changes to this business will impact billions of dollars annually spent on digital marketing.

Conventional approaches for user data collection create potential issues for users who may not wish to be identified and tracked. Such conventional approaches also create potential issues for those generating and using the identifiers due to privacy regulations and public sentiment regarding privacy. With respect to user tracking, for example, although a user might reset or generate a new identifier, such as a new device identifier, the user nonetheless remains trackable by the new identifier. Further, users have traditionally been generally unaware of how they are being tracked and the extent to which they are being tracked, thereby complicating the mechanisms required for removing the tracking. Further, a typical approach to offering the user a choice in the matter takes the form of an all-or-nothing option that only permits users to entirely opt-out of tracking. However, many users might be more inclined to agree to and benefit from collection and use of their personal data, so long as it remains secure and under the users' control. Permitting large organizations such as social networking and technology companies to collect and use this personal data frustrates both of these requirements.

In addition, conventional approaches for user tracking have transparency problems in that users that are targeted by ad campaigns often do not have a clear view of how their data was obtained for targeting or who is providing the ads. Commonly, rules related to use of a user's personal data are buried in advertising or privacy policies that are not well reviewed or understood by end users. Further, there is an increasing awareness that users cannot determine the source of ads or sponsored content.

Conventional approaches for creating and maintaining customer information stores has led to user pushback, which threatens to disrupt a sometimes complex and largely automated process of online marketing, and which, in turn, can significantly impact the personalized online experience of users. In addition, increased regulation is forcing companies to adapt their practices, but this comes with the risk of reducing the effectiveness of their marketing, losing millions invested in their customer data, and further alienating their customers by delivering poor online experiences that don't anticipate the needs of individuals.

Example embodiments of the invention provide technical solutions that solve shortcomings of conventional technologies for online user data collection and use by implementing a distributed system that enables a user to build and maintain a data vault that stores user data in a manner that ensures that the user maintains control over which portions, if any, are shared with third parties. In some embodiments, the data stored in the data vault may utilize security and encryption techniques such as secure multiparty encryption, public-key encryption, Rivest-Shamir-Adleman (RSA) encryption, or the like in order to mitigate the likelihood of misuse or improper access of the data. In some embodiments, user data may categorized into different types of user data such as user profiling data (e.g., behavioral data, demographic data, etc.) that has been decoupled from personal identifiable information (PII), with the user in control of the access rights, privacy settings, and association between the two data sets. In some embodiments, an administration user interface enables users to control access to their anonymized profiling data. In some embodiments, the system also enables users to control access to their data across multiple brands, sites, and applications without requiring the user to log-in to each brand system. The distributed and decoupled nature of data storage in the consent network architecture disclosed herein enhances the security and privacy of user data. The administration user interface improves user control over access rights and privacy settings vis-a-vis external entities attempting to accessing user data. Furthermore, the example embodiments of the invention utilize blockchain technology to create an fault-tolerant indelible log of activity throughout the system, incentivizing all parties to act in good faith.

In some embodiments, access rights and privacy settings of user data stored in a data vault are recorded on a blockchain consent network. Granting and revoking of consent may be tracked via the use of smart contracts in the consent network. In some embodiments, interaction with a user interface will invoke a smart contract function that writes information regarding access rights and privacy settings of user data to a distributed ledger that is shared across the blockchain consent network. In some embodiments, access rights and privacy settings are written to the blockchain consent network in the form of consent tokens. In some embodiments, consent tokens may be stored on a private blockchain in order to facilitate access to user data.

The immutability of blockchain records provides a secure and reliable way to determine consent. In some embodiments, a token-based structure may be used to determine permissions and access rights. For example, an enterprise user may collect a user consent and generate a consent token that is sent to the blockchain for storage. This permits the consent to be later identified via the token for auditing purposes or to prove compliance, for example. Further, in this manner, the data storage can be decoupled from the decentralized storage of the consent itself. Digital signatures may be used to ensure the identity of entities associated with the consent token. For example, a user may encrypt the generated consent token with the company's public key, which, in turn, must decrypt the consent token with its private key (that only the company has access to) before the consent token is written to the chain. Digital signatures may add an extra layer of security as any entity who intercepts the encrypted consent token would not be able to decrypt the token without access to the associated company's private key.

Furthermore, the blockchain consent network may assist in performing remote updates to data. For example, a user may update data in the data vault associated with a Company, such as permission data (consent, revoke), compliance data, status data, contact data, or the like, and these changes can be forwarded to or discovered by the appropriate parties such as, for example, via association of the consent token. This represents an improvement over traditional methods for performing the core functions of databases of creating, reading, updating, and deleting (CRUD) records as it requires explicit login access to a server. Allowing users to update their data in the data vault, with changes recorded on a blockchain or other decentralized authority, permits databases to be updated in a decentralized and remote fashion, enhancing the security and privacy of user data, while also increasing the transparency of the usage and access of that data.

FIG. 1 illustrates an example system 100 for securing and tracking user data in accordance with example embodiments of the invention. System 100 may include a computer system 110, a private blockchain 10 that facilitates matching of users and anonymous user data records, a public blockchain 12 for transparently and immutably publishing system activity, one or more user devices 120, an anonymized database 14, one or more advertiser devices 140, one or more publisher platforms 150, and various other components. The computer system 110 may provide a secured private platform through which advertiser devices 140 may provide targeted advertisements to users (such as via their user devices 120) who permit use of their user data. In some embodiments, the advertisements may be delivered to users via publisher platforms 150.

The private blockchain 10 may store user-defined privacy settings, a record of advertisement delivery by the computer system 110, a link to one or more records in the public blockchain 10, and/or other data that is not publicly made available. The user defined privacy settings may specify whether and what types of profiling data may be used by the computer system 110, types of ads that are permitted, an expiration of such permission, and/or other settings that define control over the use of the user data. In this manner, the user may have "ownership" over the user's user data. The record of advertisement delivery may include information that specifies when an advertisement was delivered, an identification of the advertisement, a channel in which it was delivered (such as via email or general ad), and/or other information that can be used to verify that the advertisement was actually delivered.

The private blockchain 10 may include one or more nodes that are connected to one another using one or more connection protocols, including a peer-to-peer connection protocol. The particular number of, configuration of, and connections between the nodes may vary. The private blockchain 10 may include a private distributed ledger that each node may store. The computer system 110 may restrict access to the private blockchain 10, securing its privacy. For example, in implementations in which a user wallet 122 configures user device 120 as a node in the private blockchain 10, the user wallet 122 may access only data pertaining to the user device 120 via public-private key encryption. In this example, data on the private distributed ledger or a blockchain transaction relevant to a given user wallet 122 may be encrypted by the computer system 110 using the user wallet' public key such that only the user wallet's private key can decrypt its contents.

The public blockchain 12 may store a user's reward balance, information relating to when a user granted access to the user's user data, information relating to when an audience order was made, an advertisement submitted by an advertiser 140 for provision to users, a listing of offered space (such as within a website) of a publisher 150 in which the advertisement can be placed, reward payment information, and/or other information that is made available to the public for transparency.

The public blockchain 12 may include one or more nodes that are connected to one another using one or more connection protocols, including a peer-to-peer connection protocol. The particular number of, configuration of, and connections between the nodes may vary. The public blockchain 12 may include a public distributed ledger that each node may store. Unlike the private distributed ledger of the private blockchain 10, the public distributed ledger of the public blockchain 12 may be read and written to by any node that is registered with the public blockchain.

Each of the private and public blockchains (10, 12) may be implemented in various ways, except that the private blockchain 10 may enforce credentialed access to a distributed ledger, as described above. In each blockchain, a corresponding distributed ledger may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. Other blockchain platform technologies may be used as well, such as the Ethereum platform, described in the white paper, "Ethereum Specification" (https://github.com/ethereurn/wiki/wiki/White-Paper), the contents of which are incorporated by reference in its entirety herein.

The anonymized database 14 may store user data, which may be considered private data of a user. For example, the user data may include behavioral, demo-graphic, location, and/or other data relating to the user. The behavioral data may include shopping data, Internet browsing data, and/or other online activity information of a user. The location information may include a current location of a user, historic location of a user, and/or other information that indicates a place, address, or other geolocation of a user. The user data may be anonymized by storing only an anonymous identifier in association with the user data.

The linking database 16 may store a link between a user identifier assigned to the user and a device identifier if the user has granted permission to use the user's user data. The user identifier may be stored in association with personally identifiable information of the user. The link may be deleted if the user revokes the permission. In this case, any linkage between the user identifier and the device identifier will be lost and the user data will not be identifiably linked to the user.

In some embodiments, system 100 may comprise user facing applications 30. The user-facing applications 30 may provide interfaces that allow a user to provide user-defined settings that control whether and to what extent the user's personal identifiable information and user data may be used. The user-defined settings may include advertising preferences, a setting that controls whether the personal identifiable information and user data of the user may be used for advertising, and/or other settings controlled by a user. As used herein, a permission from a user that permits the system to use certain data such as ad preferences, personal identifiable information and user data will also be referred to as a "grant."

The ad preferences may specify characteristics of ads that are permitted by the user. These ad characteristics may include a format (such as video, audio, text, etc.), duration (such as runtime length), and/or other ad parameter that can be used to filter ads for presentation to the user. As described herein, because users may be rewarded for receiving and/or interacting with ads, less preferences will lead to less filtered ads and therefore the potential for greater rewards. On the other hand, more preferences (and more privacy) may result in a potential for lesser rewards. This balance may be controlled by the user according to user preferences.

Through the user-defined setting relating to personal identifiable information, the user may control whether marketing information may be sent to the user through the user's email address, social media account, or other communication channel. The personal identifiable information may include, for example, an email address, a social media account, a name, and/or other information that may be used to personally identify a user. The user may also control whether and which types of user data may be used for targeting.

In some embodiments, system 100 may comprise audience builder 34 which specifies an audience through an audience definition. The audience builder application 34 may build and transmit an advertiser request for processing at the secured private platform. The advertiser request may include an audience order, an analytics and metrics request, and/or other request to the secured private platform.

Entities such as advertisers 140 may use the audience builder application 34 to create and submit an audience order. For instance, the audience builder application 34 may provide interfaces and tools for browsing the anonymized database 14 and building an audience specification. The interfaces and tools may include options for filtering anonymous users of interest so that advertisers 140 may identify and specify users of interest based on the anonymous profiling information even if the advertisers do not know the identity of such users. In a particular example, an advertiser 140 may input an audience specification that targets users who are aged 18-30 and browse sporting goods items. Other types of profiling data may be used to specify audiences as well. Once an audience has been specified, the audience builder application 34 may build a list of anonymous identifiers (such as unique record identifiers) that are associated with the specified profiling data.

The audience order may include an advertisement specification that specifies an advertisement that the advertiser would like to distribute via the secured private platform. The advertisement specification may include an advertiser identifier, advertisement campaign parameters (such as pricing model/information-bid amount, cost per click, cost per impression, etc., a maximum budget, a starting and/or ending date of the campaign), the list of anonymous identifiers in which the advertiser may be interested based on corresponding behavioral data-in these instances, the advertiser may target anonymous users associated with certain anonymized profile data even though they cannot specifically identify these users, a type of channel to deliver the advertisement (such as via email, social media platform, mobile notification, etc.), advertising content, and/or other information that describes an advertisement to be distributed. The pricing model may dictate any amounts due to a publisher 150 (if applicable) and rewards that may be due to a user. For instance, in a cost-per-click model, the user may be rewarded if the user clicks on or otherwise interacts with an advertisement, resulting in a fee debit from the advertiser. In a cost per impression model, the reward may be provided to the user if the ad is displayed or otherwise provided to the user, whether or not the user clicks on or otherwise interacts with the ad. It should be noted that the reward model may be independent of the pricing model as well, and driven by a smart contract having terms agreed to by the user and the secure private platform.

In some embodiments, the audience order may be persistent unless it expires or is canceled by the advertiser. While the audience order is unexpired and not canceled, the system may periodically update relevant users who have profiling data that match the specifications in the order and who have permitted use of their profiling data.

The analytics and metrics request may be a request to provide analytics or metrics relating to a specific advertiser request, campaign of advertisements, all advertiser requests for an advertiser identifier, and/or other grouping of advertisements. For example, an object type may also define an audience of users with a destination of a report or analysis being created. Audience assembly service is used in those cases that require access to private data or data secured on the private blockchain. A handler is created with the analytics data type. This allows the audience assembly to perform counts and measurement of the audience members as it assembles the matching users. This kind of data analysis occurs directly on anonymous data stores as well but some scenarios require identity and/or private blockchain transactions to be scored and tallied. For example, if the desire is to create a report that shows the age distribution of users that received a reward from a particular advertiser the advertiser may ask via the audience assembly "What are the age ranges of people that saw my ads last week". The reply from the handler, instead of being a new ad being delivered like in the other scenarios, creates a report that groups the age ranges of those people that received an ad in that time period. Other types of requests may be made as well, including queries into the secured private platform.

In some embodiments, the audience builder application 34 may encode the request as a digital object for input to specific handlers of the secured private platform. In these instances, the object may include an expected action to take such as send an email, provide an advertisement via social media, calculate data or rewards, return a query result, etc. In these instances, the appropriate handler may validate the action as an expected action.

In some embodiments, system 100 may comprise of audience assembler 36. Audience assembler 36 may take the request as input from the audience builder application 34 and process the request to deliver advertisements specified by the request, return a response to a query in the request, and/or otherwise perform an action specified by the request. In some embodiments, the audience assembler 36 may validate the object to ensure it is a valid object and recognize an object type to route the object to an appropriate handler 38. In this manner, inputs such as requests or queries may be well-defined to strictly control inputs to the system, and therefore strictly controlling corresponding outputs. The audience assembler 36 may validate the object in various ways. For instance, the object may encode a blockchain transaction identifier having a payload that includes the request. The audience assembler 36 may recognize an advertiser that created the blockchain transaction. Other validation techniques may be used as would be apparent based on the disclosure herein. For the examples that follow, delivering an advertisement will be used for illustrative purposes. It should be noted, however, that some handlers facilitate resolving queries or generating metrics and analytics reports.

Once it validates the request, the audience assembler 36 may identify a particular handler to handle the request. For example, the audience assembler 36 may recognize various properties of the object. The properties may include a specification of a type of communication channel through which an advertisement should be transmitted. In particular, the audience assembler 36 may determine that the object encodes a request to send advertisements via a social media account. In this example, the audience assembler 36 may identify the social media handler 38B for the social media platform that hosts the social media account. In another example, the object recognition module may determine that the object encodes a request to send advertisements via email. In this example, the may audience assembler 36 identify an email handler 38B.

In some embodiment, each handler may identify appropriate users in a similar manner, with specific functionality for each handler to facilitate actual delivery of an advertisement. For example, each handler may consult the private blockchain 10 and the linking database 16 to determine whether any of the anonymous identifiers specified by the request is linked to a user that has authorized use of their profiling data. For these users, the linking database 16 will include a link between the system-generated user identifier and the anonymous identifier. In some embodiments, each handler may also determine whether the specific ad being requested has been permitted to be delivered. For example, the private blockchain 10 may store indications of specific permissions granted by the user such as ad source, ad type, etc. If the user has granted access to the user's data and specific permissions for the ad type requested has been granted, each handler may add that user to a list of recipients that should receive the advertisement. The specific manner of delivery may vary depending on the specific handler used to process the request. Furthermore, each handler may provide output that does not specifically identify the users in the audience that was matched. In this manner, in some embodiments, an advertiser that made an ad order may not be provided with identities of users in the audience only that the ad was delivered to such users.

Some requests may require use of personal identifying information such as a specific communication channel. For example, an advertiser 140 may specify in the request that an advertisement be sent to relevant users' social media accounts, email addresses, and so forth (none which the advertiser does not have access to). If so, an appropriate handler 38 may add that user to be a recipient of the specified advertisement through the specified channel. For example, for a request to deliver an ad through a social media channel, the social media handler 38B may add the user to a set of users to which an advertisement will be directed through their social media account. In some implementations, the social media handler 38B may verify that the requesting advertiser has proper social media credentials to send ads through the social media platform. In some embodiments, the social media handler 38B may batch the social media account identifiers (which may be email addresses) that should receive the advertisement and send the batched social media account identifiers to an appropriate social media platform to deliver the ads. In some embodiments, the social media handler 38B may generate a hash of each social media account identifier and send the hashes to the social media platform, which matches each hash to an appropriate social media account to which to provide the ad. Similarly, the email handler 38A may add the user to a set of users to which an advertisement will be sent to their email addresses. Any user who has not supplied such permission will not be linked to any of the anonymous identifiers specified in the request and therefore will not be targeted, ensuring their privacy and preventing use of their profiling data.

The handler may cause the advertisement to be transmitted through the specified channel to the targeted recipient. Thus, while the advertiser identified an anonymous user that should receive an advertisement, the advertiser does not know who that anonymous user is. The system will be able to link the anonymous user with personal identifiable information if the user has granted permission to do so.

Some requests may not require use of personal identifying information, but still target certain users having certain profiling data. For example, the request may not specify that a user's communication channel be used to communicate the ad, but may specify a set of anonymous identifiers the advertiser wishes to target. In this example, other handlers may add the advertisement to a queue of advertisements to be delivered to users who have permitted use of their profiling data (including any permitted types of ads). For example, the queue may store advertisement identifiers that are associated with device identifiers. For example, once a handler 38 has identified a user that should receive an advertisement via a channel other than the Ads in the queue may be provided to users through publisher platform 150 such as a website that will include the ads. In these instances, if a user who has permitted use of his profiling data browses the website that is affiliated with the secure private platform, the secure private platform may provide the website with an ad from the ad queue for presentation in the website. To do so, the website may implement an agent, such as a JavaScript program, that communicates with the secure private platform. The agent may obtain the system-generated user identifier of a user who has permitted the system to use his profiling data. The system-generated user identifier may be stored locally on the user device 120 such as through a browser cookie. The agent may transmit the system-generated user identifier to the secure private platform, which may recognize that the system-generated user identifier has permitted ad delivery. The secure private platform may determine whether any ad has been associated with the user's system-generated user identifier (and ensure any other user-defined settings permit delivery of this ad), indicating that the ad was targeted for that user based on the user's profiling data. If so, then the secure private platform may transmit the ad to the website for presentation to the user.

Any clicks or interactions of the ad may be tracked for payment purposes. For instance, the advertiser 140 may be charged per click according to the ad budget in a request, the website may be provided with a fee for serving the ad, and the user may be provided with a reward for agreeing to permit use of his profiling data.

Some requests may not require use of personal identifying information and not target certain users. In this case, processing may continue as with the targeted delivery via an advertising queue, but without ads being previously associated with a system-generated user identifier. For example, the agent on a website may detect a system-generated user identifier and transmit the identifier to the secure private platform. This indicates to the secure private platform that a user is browsing an affiliate website. The secure private platform may select an ad from a general ad queue (one that is not targeted to users having particular profiling data), check any user-defined settings that permit delivery of the ad, and transmit the ad to the website if delivery is permitted to that user.

Whichever handler 38 is used to process a request, the secured private platform will deliver advertisements to users who have permitted used of their profiling data while not providing an personal identifying information of the user to the advertiser.

In some embodiments, system 100 may comprise of electronic ad marketplace 40. The electronic ad marketplace 40 may provide electronic interfaces and tools for advertisers 140 and publishers 150 to transparently participate in an electronic advertising marketplace. For example, electronic ad marketplace 40 may receive advertisement information from advertisers 140. The advertisement information may include the advertisement content in any format (e.g., video, audio, text, graphics, etc.), an electronic address such as a Uniform Resource Locator (URL) to the advertisement content, metadata relating to the advertisement (e.g., size, type, format, etc.), advertisement campaign parameters, and/or other information relating to the advertisement that the advertiser 140 would like to be provided to users via the secure private platform. The electronic ad marketplace 40 may publish the advertisement information, such as by writing the advertisement information to the public blockchain 12.

The electronic ad marketplace 40 may receive publisher information from publishers 150. The publisher information may include an electronic address of the publisher (such as a URL of the publisher's website), a location of the space allocation on the website for advertisements, size allocated for the advertisement (such as absolute dimensions, relative dimensions, etc.), publishing parameters such as a minimum asking price for publishing an ad, subject matter for a given site, and/or other information relating to the publisher. The electronic ad marketplace 40 may publish the publisher information, such as by writing the publisher information to the public blockchain 12.

In an implementation, electronic ad marketplace 40 may generate one or more smart contracts based on the advertisement information, the publisher information, reward information, and/or other information that may be used to self-execute an agreement between parties. For example, a smart contract may encode one or more rules that execute terms of a contract if the campaign parameters have been satisfied, the publisher's parameters have been satisfied, the advertisement has been transmitted to a user, which may occur via a publisher. The terms of the contract may include the bid amount an advertiser is willing to pay, an amount to be paid to a publisher, an amount to be rewarded to a user for permitting use of his profiling data, and/or other terms.

In some embodiments, system 100 may comprise ad delivery service 52. The ad delivery service 52 may deliver ads to a user. For example, the ad delivery service 52 may execute one or more smart contracts. Accordingly, the ad delivery service 52 may provide an ad to the user depending on the state of each of the ad queues, which were populated by respective handlers 38, and the trigger conditions encoded by one or more of the smart contracts.

In some embodiments, the engagement monitor 54 may monitor user engagement with an advertisement. For instance, user engagement may include having been presented with an advertisement (such as impression), clicking on a link, inputting a command to retrieve content associated with the advertisement, or otherwise interacting with a call-to-action of the advertisement. The engagement monitor 54 may collect metrics relating to the engagement, such as a number of impressions, a click-through-rate, a cost-per-click, a cost-per-impression, and/or other metrics. Such metrics may be stored as engagement data in the anonymized database 14. The engagement data may be stored in association with an anonymous identifier. In this manner, the user may permit (or deny) access to this engagement data as well. In some embodiments advertisers 140 and others may query the anonymous engagement information and may build audiences based on the engagement information or other profiling data.

Satisfying the terms of Ad Marketplace smart contracts will also depend on the integrity of the immutable record and whether or not all sides of the contract have not been altered externally from the originally agreed on assets. Smart contracts created in this marketplace will be automatically invalid if, for example, the checksum and/or properties of the image that was defined for the marketplace has changed.

Whether the ad delivery service 52 transmitted the ad through a specific channel or the ad queue, the blockchain processor 50 may generate a transaction that includes a payload that specifies that the advertisement was transmitted to and/or interacted by the user. For example, the payload may indicate that a user associated with the anonymous identifier was provided with an advertisement. Furthermore, the blockchain processor 50 may cause appropriate debits from the advertiser, credits to any delivery platform, and any rewards for the user to be provided. These transactions may be self-executed according to a predefined smart contract and recorded on a public distributed ledger. In this manner, the advertiser can verify that the advertisement was delivered, open consult the fee provided to any delivery platform, and also verify rewards provided to the user. Other relevant stakeholders may similarly verify the transactions as well.

Each request handler may be specifically compiled or otherwise instantiated by the system. Thus, new handlers may not be added unless specifically compiled or instantiated, improving security of the secured private platform.

In some embodiments, system 100 may comprise scoring engine 55. In an implementation, the user scoring engine 55 may generate a user score that indicates an assessment of the quality of the data known about the user. The user score may be expressed as a numeric score, a letter score, and/or other type of score that can quantitatively assess the quality of the data known about the user. For example, the user score may reflect the amount of profiling data such as browser data, connected networks, purchase and interests data, demographic data, and/or other information known about the user. Generally speaking, the more that is known about the user, a value of the user score will be greater than if less is known about the user.

In an implementation, the user score may be used to affect a reward provided to the user. For example, a user having a greater value user score may be provided with a greater reward than a user having a lower value user score. In some embodiments, the user score may be used by advertisers to screen audiences. For example, an advertiser may target users that have a minimum user score. In this manner, the advertiser may target users whose quality of data meets a certain value.

To an extent, the user may influence his user score by permitting more access to the user's data, using the system to conduct online activities, and/or otherwise providing more access to the user's data. In this manner, the user may seek to maximize his rewards by allowing more access, or more tightly control such access but receive less rewards. In this manner, the system facilitates control by the user of the user's data while incentivizing the user to permit greater levels of access.

In some embodiments, system 100 may comprise publisher API 56. Publisher API 56 may provide interfaces and tools for publishers to customize the experience for users browsing their site. For example, the API 56 may communicate with publisher agents (such as JavaScript or other application operating on a user device) operating at the publisher sites. The secure private platform may provide the publisher agents to a publisher 150, which implement the agents on its sites.

The publisher agents may be customized to interact with users who visit (in other words is in electronic communication with) a publisher's 150 site. For instance, a publisher agent may be customized to ask a user whether they would like to share a reward in exchange for permission to serve ads on the site. If the user agrees, the publisher 150 and the user may share rewards resulting from ad delivery and/or interaction. The publisher agent may be customized to ask a user to participate in the secure private platform and offer to register the user to enroll to use the platform. In this manner, the user may be enrolled and provide permission to use profiling data. In some embodiments, the publisher agent may perform similar functions as the profiling agents 126, in that a system-generated user identifier may be stored and detected on the user device 120.

To facilitate the foregoing, in an implementation, the publisher agent may determine whether a user is an enrolled user. If yes, then the publisher agent may obtain the system-generated user identifier. Alternatively or additionally, the publisher agent may check on a user's status via a call to publisher API 56 to obtain the status. The publisher agent may determine whether the publisher's site is whitelisted or blacklisted. If whitelisted, the publisher agent may receive, from the publisher API 56, a meta payload including a system-generated user identifier of the user, approved domains and subdomains, whether payment has been approved for the user, custom domain information (such as whether the user is a subscriber to the site), and/or other information. If the site is blacklisted, the publisher agent may request that the user whitelist the site. In some embodiments, the publisher agent may request that the user remove or add paywall, which is a subscription service required to access a site. If the paywall is added, then ads may be removed. If a paywall is removed, then the user may be asked to permit presentation of ads. In some embodiments, the whitelists and blacklists may be input by a user as part of the user's settings. In this manner, the user may customize which publishers or others may track and/or use the user's data. In some embodiments, the user may customize whether publishers or others may track and/or use the user's data on a global level that affects all publishers. In this manner, the user may specify privacy settings on a micro or macro (global) level. By doing so, the system may also provide an advantage of complying with certain privacy regulations, such as the General Data Protection Regulation of the European Union.

In some embodiments, the publisher API 56 may provide tools for the publisher to interface with the electronic ad marketplace 40. For instance, the publisher 150 may be provided with calls to the publisher API 56 to view and select offers to place ads on a site of the publisher. In this manner, publishers may be directed connected to advertisers. In some of these instances, agreements among pricing may be enforced by smart contracts as before, but manually agreed upon first before automatic execution and recordation.

The user device 120 may be operated by a user to interact with the private and public blockchains (10, 12) and conduct activity that is monitored and stored in the anonymized database 14. For instance, the user device 120 may be programmed by a private wallet 122, a public wallet 124, one or more agents 126, and/or other components. The private wallet 122 may be used to interact with data pertaining to the user device 120 on the private blockchain 10. For instance, the private wallet 122 may access a private key to decrypt data on the blockchain that is intended to be accessed only by the holder of the private key. The private wallet 122 may store a blockchain address, which is used by the private blockchain 10 to identify the private wallet. The public wallet 124 may enable access to the public blockchain 12. For instance, the public wallet 124 may be used to view a user's reward balance, interactions with advertisements, and/or other public information stored on the public blockchain 10.

It should be understood that although the various instructions are illustrated in FIG. 1 as being co-located within a single processing unit, in implementations in which processor(s) 20 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 20 may be programmed by one or more additional instructions that may perform some or all of the functionality attributed herein to one of the instructions.

The various instructions described herein may be stored in a storage devices 22, which may comprise random access memory (RAM), read only memory (ROM), and/or other memory. The storage device may store the computer program instructions (such as the aforementioned instructions) to be executed by processor 20 as well as data that may be manipulated by processor 20. The storage device may comprise one or more non-transitory machine-readable storage media such as floppy disks, hard disks, optical disks, tapes, or other physical storage media for storing computer-executable instructions and/or data.

For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The components illustrated in FIG. 1 may be coupled to one another via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing figures, different numbers of entities than those depicted may be used. Furthermore, according to various implementations, the components described herein may be implemented in hardware and/or software that configure hardware.

Figure 2:
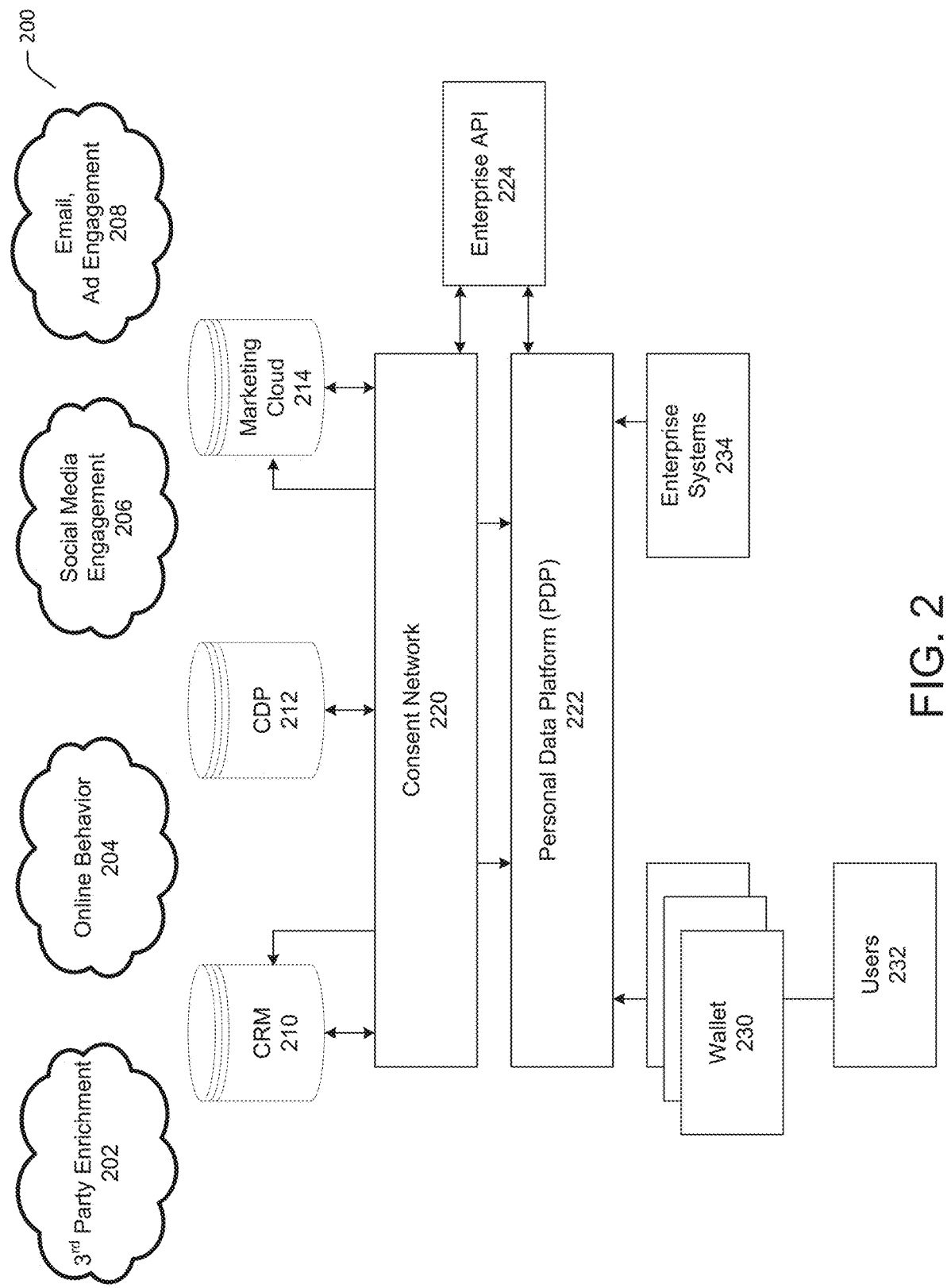
FIG. 2 is an example network diagram of a system for tracking and securing user data, in accordance with the embodiments disclosed herein.

FIG. 2 is an example network diagram 200 of a system for tracking and securing user data. In some embodiments, network diagram 200 may comprise the different components used to store, communicate, and execute functionality of system 100. Network diagram 200 may provide a visualization of the connections between the different components of the system 100. For example, the databases 210, 212, 214 may communicate with Enterprise Systems 234 through the Enterprise API 224 and Personal Data Platform (PDP) 222. In some embodiments, network diagram 200 maps out the structure and connectivity of the network used to perform the methods of the system 100 disclosed herein.

In some embodiments, network diagram 200 comprises enterprise data sources such as $3^{rd}$ party enrichment data source 202, online behavior data source 204, social media engagement data source 206, and email/ad engagement data source 208. In some embodiments, brand data sources may be cloud computing instances that collect, store, process, and transmit data. In an embodiment, the $3^{rd}$ party enrichment data source 202 may comprise data collected from entities who aggregate information pertaining to individual users. For example, the $3^{rd}$ party enrichment data source 202 may cross-reference data across multiple different web-based platforms to build user profiles. Online behavior data source 204 may comprise data relating to user web browser activity. For example, online behavior data source 204 may store data indicative of websites frequently visited by a user. Social media engagement data source 206 may include data indicative of user interactions with various social media platforms. For example, social media engagement data source 206 may collect data indicative of time spent on a particular social media platform. Email/ad engagement data source 208 may include information collected from email and advertising campaigns. For example, email/ad engagement data source 208 may include an email thread between an entity and a user from an email marketing campaign.

In some embodiments, network diagram 200 may comprise information storage devices (e.g. databases) such as Customer Relationship Management (CRM) storage 210, Customer Data Portal (CDP) storage 212, and Marketing Cloud storage 214. In some embodiments CRM storage 210 may include customer relationship management data. For example, CRM storage 210 may include a table identifying all customers associated with a specific enterprise company and various attributes of such customers. In some embodiments, CDP storage 212 may include data specified directly by a registered user. For example, CDP storage 212 may include username information for registered users. In some embodiments, Marketing Cloud storage 214 may include information about marketing campaigns associated with a user. For example, Marketing cloud storage 214 may include formation identifying advertising and marketing campaigns targeted to a specific user.

In some embodiments, network diagram 200 may include consent network 220 and personal data platform (PDP) 222. The consent network 220 may act as data storage for consent data and may be accessible by both end users 232 and enterprise systems 234. The PDP 222 may be used to grant or revoke consent by the end users 232. Similarly, enterprise systems 234 may access the consent network 220 via the PDP 222 to determine the current consent status for particular user data. The data to which a particular consent status applies may come directly from an end user 232 via an online or in-person event or may be sourced from a third party (e.g., enterprise CRM data from CRM storage 210). Irrespective of the origin of the data, the end user 232 remains in control of the consent status for the data, which may be easily retrieved by enterprise systems 234 via consultation of the consent network 220.

In some embodiments, consent network 220 may be a distributed network comprising a plurality of computers communicating with one another through digital messages. In some embodiments, consent network 220 may be a blockchain network which securely tracks consent of user data. In some embodiments, consent network 220 may store access rights and permission settings relating to user data. Access rights and permission settings of user data may be specified in consent tokens stored on the blockchain consent network 220. Consent tokens may validate access and provide the location of the user data in the data vault for which consent has been given. Consent network 220 may be connected with Application Programming Interfaces (APIs) (e.g., API 224) to communicate information to and from user devices and enterprise systems 234.

In some embodiments, the PDP 222 may include interfaces, APIs, and/or applications configured to communicate information between entities (e.g. end users 232, enterprise systems 234, etc.) and consent network 220. In some embodiments, PDP 222 may enable end users 232 to consent to access rights and permission settings of data stored in a data vault.

In some embodiments, enterprise API 224 may include a set of functions, procedures, and methods to facilitate interaction between enterprise systems 234 and consent network 220. Enterprise API 224 may perform functionality that allows an enterprise to request a receipt regarding consent to user data. Enterprise API 224 may enable enterprises to update their policies to match their data usage. Enterprise API 224 may enable integration of user consent into enterprise data storage systems. Enterprises may utilize enterprise API 224 to request proofs (e.g. zero knowledge proofs) regarding user data stored in the system.

In some embodiments, network diagram 200 may include wallets 230. A digital wallet is a software system that securely stores user information. Specifically, digital wallets are used to store user payment information and passwords. In some embodiments, a user may be assigned a wallet address upon enrollment in the system (e.g., system 100). The wallet address may be used internally by the system to identify the user and link the user's browsing activity with the user's personal identifying information, demographic information, and/or other private information that may be stored in the user's profile or data vault, such as email addresses, social media account details, cookies, etc. In some embodiments, the wallet address may be used to distribute rewards to users in the system. In some embodiments, the wallet address may be used as a unique identifier for identifying a user score corresponding to a user. For example, based on the type of data shared by a user, their wallet address may be assigned a user score which may be used to determine rewards for which the user is eligible. In some embodiments, a data notary service may be provided that allows data fingerprints (e.g., hashes) from the wallets 230 to be recorded on the consent network 220 as proof of that the data in the wallet 230 has not be altered. This can be used as proof to an entity operating the consent network 220, enterprise brands, and users, of the integrity of the PII and other data stored in the user wallet 230.

In some embodiments, Enterprise Systems 234 may include a marketing or advertising system. In some embodiments, Enterprise Systems 234 may utilize the consent network 220 and/or PDP 222 to supplement or add to its existing data for use in marketing, advertising, etc. In some embodiments, Enterprise Systems 234 may be used to generate marketing material or targeted advertising for specific demographics. In some embodiments, Enterprise Systems 234 may be used to generate rewards for users based on the data they have consented to share. In some embodiments, Enterprise Systems 234 may be used to generate a user score for users based on the data they have consented to share.

Figure 3A:
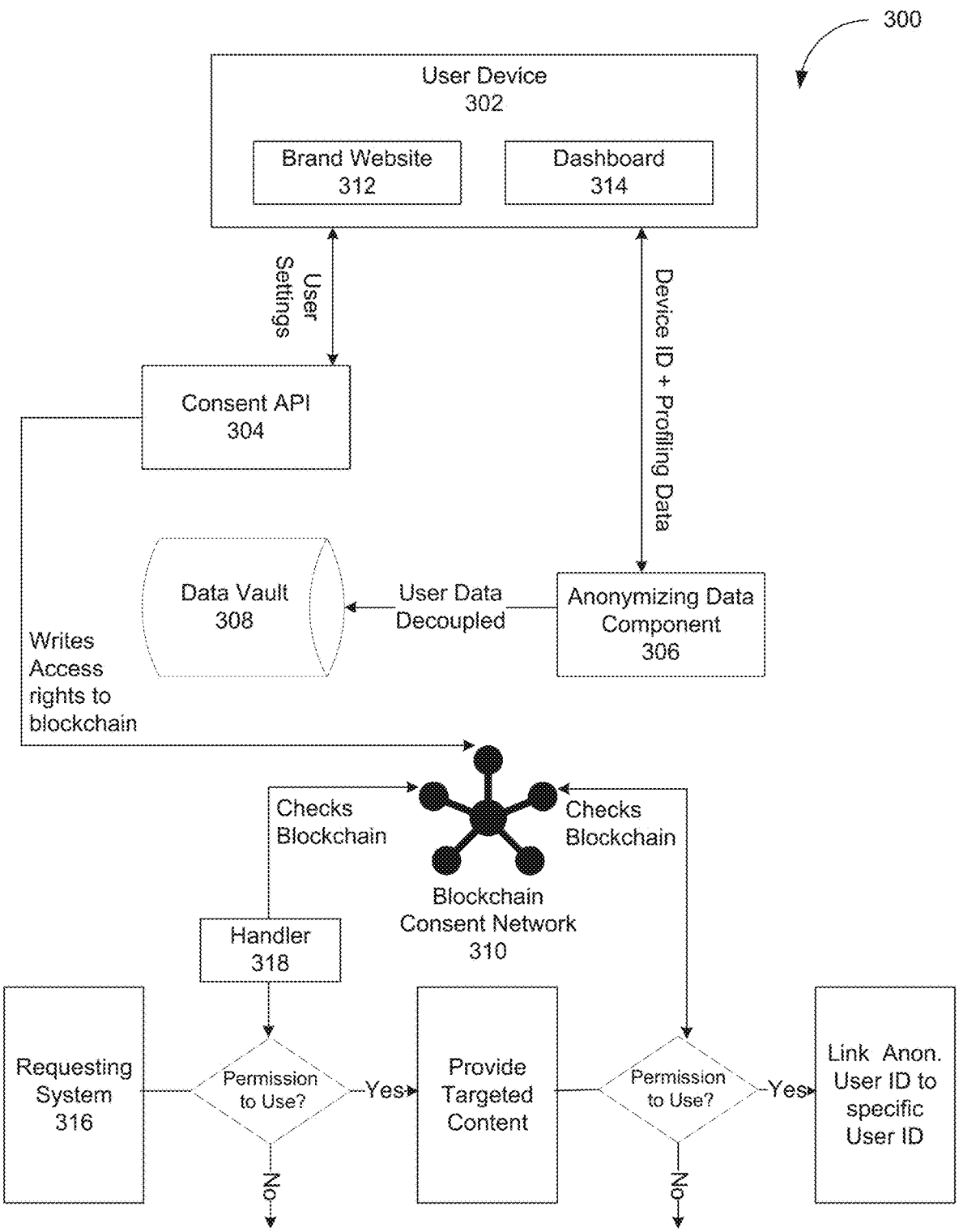
FIG. 3A is an example data flow diagram for tracking and securing user data, in accordance with the embodiments disclosed herein.

FIG. 3A is an example data flow diagram 300 for tracking and securing user data. In some embodiments, data flow diagram 300 specifies the dependencies and relationships between components of the system 100 and the example network diagram 200.

FIG. 3A depicts a user device 302. In some embodiments, user device 302 may include hardware capable of internet communication. For example, user device 302 may be a desktop, laptop, or notebook computer; a hand-held computing device (e.g., a personal digital assistant (PDA), a smart phone, a tablet, etc.); a wearable device; mainframes, supercomputers, workstations or servers; or any other type of special-purpose or general-purpose computing device as may be desirable or appropriate for a given application or environment. In some embodiments, user device 302 has a unique identifier associated with the hardware such as a Media Access Control (MAC) address, a product serial number, or the like. In some embodiments, the unique identifier associated with user device 302 can be used to link different pieces of user data that have been de-coupled.

FIG. 3A also depicts a consent API 304. In some embodiments, consent API 304 may include a set of functions and procedures enabling interaction between the user device 302 and a blockchain consent network 310 (which may be an implementation of the consent network 220). In some embodiments, consent API 304 may include API endpoints utilized by applications executing on the user device 302 to request specific information and invoke specific functionality. For example, consent API 304 may have an API endpoint for modifying consent settings related to profiling data stored in a data vault 308. In some embodiments, consent API 304 may be used to retrieve consent information from the blockchain consent network 310. In some embodiments, consent API 304 may utilize a block explorer in order to query and retrieve information from the blockchain consent network 310. In some embodiments, consent API 304 may allow for batch calls such that multiple access rights and permission settings are specified in the same API call. For example, a user wish to change multiple access right settings for different enterprise companies. In this example scenario, the user may utilize a batch API call to modify multiple different access rights and permission settings, which may be represent an efficiency improvement over individual API calls.

In some embodiments, consent API 304 may generate consent tokens based upon the access rights and permission settings specified by the user. A consent token may be representative of a consent event according to which a user provides consent to one or more brands to utilize one or more types of user data associated with the user. Attributes of a consent event may be represented as data within the corresponding consent token. In some embodiments, a consent token may include information used to authenticate a user's authorization to control access rights to corresponding user data in the data vault 308. In some embodiments, a consent token includes information identifying a source of the consent. For example, the consent token may indicate whether consent was sourced from a user click, a user login, a user registration, an in-person verbal consent, a digital signature, a physical signature, or any other type of suitable consent action. In some embodiments, a consent token includes geographic information relevant to the consent such as any relevant consent requirements applicable to a geographic location associated with the user. In some embodiments, a consent token includes an internal reference, which may indicate a system or identifiers related to the use of the data like sales databases, data imported from 3rd parties, and so forth.

In some embodiments, a consent token includes data type information. The data type information may indicate what specific information is the consent relates to such as whether the consent relates to aggregate analytics, personal information, an end-user license agreement (EULA), or a specific piece of data such as a phone number. In some embodiments, a consent token includes a scope of the consent that indicates how widely the consent applies including, for example, whether the consent can be traded between multiple domains and/or across organizations or if the consent is brand specific. In some embodiments, a consent token identifies restrictions associated with the consent such as a time of expiration of the consent, whether the consent expires automatically after a certain period or under certain conditions, or the like. In some embodiments, a consent token includes a consent type of the consent such as whether the consent token represents a grant of consent, a denial of consent, a revocation of consent, an update/change to a previously provided consent, a compliance request, etc.). In some embodiments, the consent token may include an encrypted location of the data to which the consent token corresponds. The encrypted location may be decrypted upon validating proper consent for an enterprise to access the user data associated with the consent token. The decrypted location may be used by an API to retrieve the user data upon proper validation of consent.

FIG. 3A further depicts an anonymized data component 306. In some embodiments, anonymized data component 306 may include a set of computer executable instructions for decoupling PII of a user from other user data. In some embodiments, anonymized data component 306 determines linking information between the decoupled user data. In some embodiments, anonymized data component 306 may include a database that stores linkage data. Linkage data may be, for example, a table which maps an anonymous identifier associated with user profiling data stored in the data vault 308 to a user identifier that is associated with the PII of the user.

In some embodiments, the data vault 308 includes an encrypted and secure data storage system. In some embodiments, data vault 308 may be stored in a centralized database server. In some embodiments, data vault 308 may be stored in a distributed storage system such as the InterPlanetary File System (IPFS), which is a protocol and peer-to-peer network for storing and sharing data in a distributed file system. In some embodiments data vault 308 is a structured data storage architecture which implements historical tracking. In some embodiments, data vault 308 contains a set of uniquely linked tables. In some embodiments, the linkage information of the set of uniquely linked tables is stored outside the data vault 308. For example, there may be a linkage database that stores linkage information between different data types of user data.

In some embodiments, the data stored in the data vault 308 may utilize security and encryption techniques such as secure multiparty encryption, public-key encryption, RSA, etc. in order to mitigate the chance of misuse or improper access of the user data. In some embodiments, user data may categorized into different types of user data such as user profiling data (e.g., behavioral data, demographic data, etc.) that has been decoupled from PII user data, where the user has control of the access rights, privacy settings, and association between the different types of user data. In some embodiments, the data vault 308 is accessed through APIs that first determine proper access, and then retrieve and/or modify stored information in the data vault 308.

In some embodiments, blockchain consent network 310 may include a private blockchain that is only accessible by registered users of the system (e.g., system 100). In some embodiments, blockchain consent network 310 may store information related to access rights and permission settings of user data specified by the user. In some embodiments, blockchain consent network 310 includes a distributed ledger and a smart contract infrastructure. In some embodiments, the distributed ledger is used to store consent information, such as consent tokens, and host smart contracts to execute functionality that can be create, modify, retrieve, and delete data stored in the distributed ledger.

In some embodiments, the user device 302 may present a UI that allows a user to indicate permissions (e.g. user settings) to use the user's personal or profiling data, such as data collected by tracking the user via a device ID associated with the user device 302 while browsing the Internet. The UI may provide the user with various tools and information for indicating permissions relating to the use of the user's personal or profiling data. The UI may be provided via a website 312 of a specific brand; however, the user data is not available to or being displayed by the brand. Rather, the brand is merely providing access to a user to her user data stored in the data vault 308 via the consent API 304 such that the user is provided the capability to set permissions for user data through the UI. Alternatively, the UI may be provided as part of a generalized dashboard 314 via which the user can establish permissions for multiple different brands.

After the user's profiling data is collected, the anonymizing data component 306 may anonymize the collected user profiling data by decoupling the user profiling data from the device identifier to generate anonymized profiling data. The anonymizing data component 306 may then store the anonymized profiling data (e.g., browsing history, purchase data, etc.) in the data vault 308. This anonymized data may be linked to a personally identifiable data type of the user only if the user permits it.

The user is provided with permission grant and revoke controls via the UI to permit or exclude the use of certain types of the user's data stored in the data vault 308. The user can edit these permissions at any time. It should be appreciated that the data in the data vault 308 can be expanded beyond the profiling information. It should be further appreciated that granting and revoking of consent via the consent network 310 may be applied to data outside of the data vault 308 including, for example, data stored in-house by an enterprise.

In some embodiments, a separate identifier for the anonymized profiling data (e.g., an anonymized user ID) may be generated and associated with the anonymized profiling data such that others, e.g., advertisers or marketers, need not obtain the user's PII in order to target advertising to the user based on the user's anonymized profiling data. Rather, the system coordinates the linkage between targeted anonymized profiling data and the user's personally identifiable data, e.g., device ID, email address, social media account details, cookie, etc.

From the advertiser's or marketer's perspective, the anonymized profiling data (if permission is granted by the controlling end user) is available to be targeted and contains a rich data set for doing so, but without any PII of the user. This permits the advertiser or marketer to target users with fine granularity, but without overstepping privacy permissions granted at the controlling user level. From the perspective of enterprises that wish to comply with user's consent, whatever it may be at any given time, enterprise systems that utilize customer data can continue to operate with other sales and marketing databases and tools, and when an end user changes consent or updates information, the current state of the end user's data is available to the enterprise. Companies can honor such consent in an automated process that interfaces with their existing information technologies and databases, but in a manner that allows the end user to manage the permissions and consent to their own information without needing to directly use interfaces specific to each individual company. In addition, companies gain automated compliance to user consent, which is useful for ensuring regulatory compliance, without having to build and maintain new user experiences, which can be costly.

In some embodiments, data that is to be securely stored, such as a user's PII, a link between the user's PII (e.g., a user's ID) and the anonymized profiling data, and/or the anonymized profiling data itself, may be stored in a secure data vault (e.g., data vault 308), which may be a distributed database system or a private blockchain. Data that is to be generally available, e.g., a reward amount granted for using anonymized profiling data, ad parameters, reporting data, or the like, may be stored in a publicly or generally accessible location, such as a public blockchain. From the end user's or public's perspective, the advertiser's or marketer's data should be auditable. For example, the source of an ad is discoverable by linking the advertiser to the ad in question. This may be accomplished by writing the ad campaign details to the public blockchain and permitting it to be identified by interested parties. Moreover, certain checks can be made, such as confirming that the ad follows an agreement made, such as a predetermined size, duration, location, etc.

As shown in FIG. 3A, a requesting system 316 may wish to use the anonymized profiling data of a user or other data stored in the data vault 308 for targeted advertising or other content delivery. In some embodiments, an audience builder application may be provided to allow such interested systems to supply or select from information (e.g., demographic information) that permits determining appropriate corresponding anonymous profiling data. Once a desired audience has been specified by the requesting system 316, a list of anonymous identifiers (e.g., unique record identifiers) that are associated with the identified profiling data may be compiled. The use of the anonymized record data is subject to permission checks related to user-based permissions.

More specifically, a handler 318 may consult the blockchain consent network 310 to determine whether any of the anonymous identifiers specified by the request of the requesting system 316 is linked to a user that has authorized use of their corresponding profiling data. For any such user, a link may be stored between the user identifier and the anonymous identifier (e.g., a device identifier). In some instances, the handler may also determine whether the user has granted permission to deliver the specific type of ad to the user. If the user has granted access to the user's data and specific permissions for the ad type requested has been granted, the handler may add that user to a list of recipients that should receive the advertisement. The specific manner of delivery may vary depending on the specific handler used to process the request.

The requesting system directly or indirectly identifies anonymous user profile data that should receive an advertisement. The advertiser does not know who that anonymous user is, even if the user is specifically targeted, because the system acts as a buffer and does not release the linking data. The system will be able to link the anonymous user data with personal identifiable information, if the user has granted permission to do so. Reporting metrics such as ad views and reward earnings may also be served to requesting systems.

Because the user's data vault 308 can be expanded to contain additional information, the permissions or consents can be extended to uses of other data such as identity verification, claim verification, proofs of status or compliance, etc. Therefore, while the above example relates to checking a blockchain consent status and identifying a user's device or a user for targeted advertising, a similar mechanism can be provided to ascertain the ability to use or confirm other data stored in the user's data vault 308 or stored about the user, as new use cases arise.

Figure 3B:
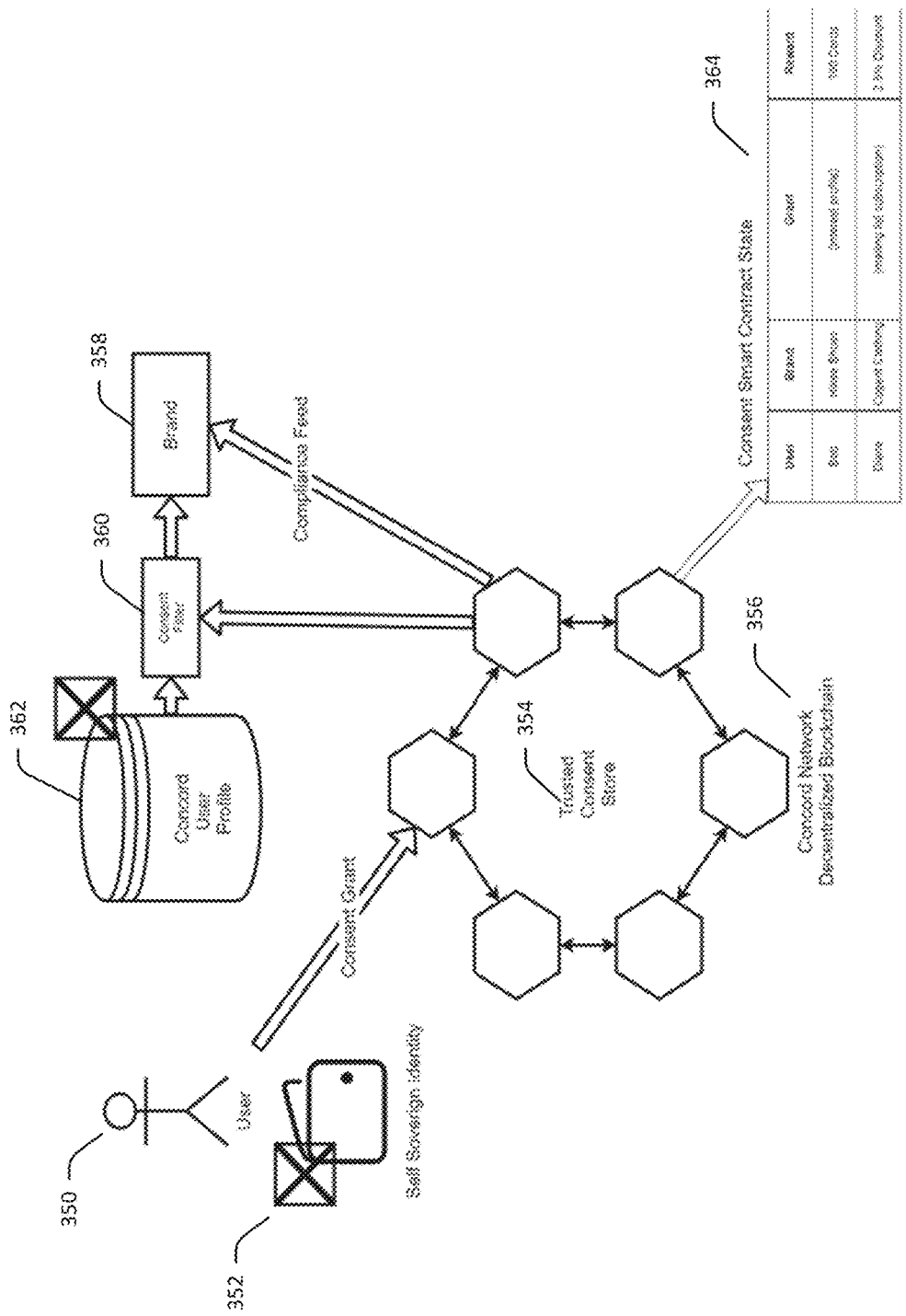
FIG. 3B illustrates an example operation of a consent network that utilizes smart consent contracts, in accordance with the embodiments disclosed herein.

FIG. 3B illustrates an example operation of a consent network that utilizes smart consent contracts in accordance with example embodiments of the invention. A user 350 is depicted. The user 350 may be any end user who desire to and is provided with the capability to control access to her user data by third parties. The user 350 may specify which types of user data stored in a data vault 362 that she is providing third parties with access to via a consent grant that is recorded in a trusted consent store 354 which may be implemented as a decentralized blockchain network 356 (e.g., blockchain consent network 310). In addition to PII, profiling data, and the like, the user 350 may store a wide variety of other useful data in the data vault 362, such as passwords or other credentials. This permits the user 350 to grant or revoke access to use the credential, as with the use of profiling data used in advertising or marketing applications. For example, in a single-sign-on (SSO) or social login scenario, an operator of the trusted consent store 354 acts as a SSO or social login authority, without requiring the sharing of other data, e.g., social profiles, with all the businesses interacted with in a sign-on scenario. In this manner, the SSO isn't associated with a social network or other service. The end user 350 therefore owns their SSO identity and can change or adjust what can be traded or shared with the brands such as granting access to other personal data, rather than simply accepting the list of items that social SSOs currently do. For example, the user 350 may specify an option to use a sign-in credential with various brand partners, while also specifying what additional data may be or may not be utilized or shared. The data vault functionality therefore may be generalized or adjusted to provide a variety of useful services, such as a self-sovereign identity 352. For example, the operator of the trusted consent store 354 may act as an authority to confirm an identity, group membership, status, compliance with a condition, etc., for the user 350 without revealing the identity of the user 350 (or other personal data). This permits the user 350 to utilize the service to verify claims while also retaining revocation control over the use of personal data.

In example embodiments, the user 350 may provide a consent grant that indicates which of their user data the consent pertains to, which third parties are being granted such access, and so forth. In example embodiments, the consent grant is a consent event that may be stored in a consent event database forming part of the consent blockchain network 356. The consent event may be represented by a consent token that includes various data indicative of attributes of the consent event. The consent token may be linked to a consent smart contract, which acts as a "receipt" for the consent event. In example embodiments, smart contracts may be used to facilitate consent-based transactions. By way of example, a smart contract may be used to confirm that a user ID has granted a specific brand a specific scope of consent with respect to various types of user data. Further, the smart contract may facilitate granting of rewards in view of the consent given, and may list the reward such that it can be identified, reported and credited to the user's data vault 362. In addition, the smart contract also allows the enterprise to confirm the consent has been given, and permits the system to confirm the reward has been credited, e.g., to the user's wallet account (or via another mechanism). Likewise, this provides a mechanism for data updates and changes related to consents. In example embodiments, as the data contained in a user's data vault is expanded, the type and nature of the smart contracts is likely to expand as well. For example, a consent based contract can be coded to perform automated updates to consent status or forward data changes to interested parties.

Example representations of smart contracts 364 are depicted in FIG. 3B. As illustratively depicted in FIG. 3B, each smart contract may include various information relating to a corresponding consent event from a user (e.g., user 350). For instance, an example smart contract a user identifier (e.g., name, email address, etc.); an enterprise/brand ID; data indicative of the type/scope of the consent grant to which the smart contract corresponds (e.g., mailing list subscription; interest profile; etc.); and an indication of the type of reward/incentive offered to the user in exchange for the consent grant.

In example embodiments, brands may wish to create, update, or query consent events themselves. In an example scenario, for instance, an enterprise/brand may have a large store of existing data that it would like to perform consent management with respect to and make compliance ready. Such existing data may include, for example, typical user contact information and engagement history of the brand with the contact. In an example scenario, the brand may create an automated script/service that hits an authenticated endpoint of the blockchain consent network 356. The automated script/service may send, for example, the following data for each record in their database: a hashed email; a hashed user ID (e.g., the enterprise's internal ID for the user); a domain for a site that the contact is associated with; a source of the existing data record; and a data type for the data.

In example embodiments, in response to receipt of each data record from the brand, the blockchain consent network 356 may generate a corresponding consent event and send back to the brand an authorization token (e.g., a consent token corresponding to the generated consent event); an echo of the consent event (e.g., a Javascript Object Notation (JSON) map); and an identifier of the consent event). The brand may then store the received authorization token in the corresponding data record for the user in its CRM database, for example. The brand may periodically check the authorization to ensure that is remains valid, as will be described in more detail later in this disclosure. In example embodiments, use of an authorization token instead of an consent event ID alone provides a faster validation service because the brand does not need to query the full details of the consent event to determine if it is still valid, but rather than can determine validity based on the authorization token alone. Moreover, use of an authorization token can support, for example, a bulk list of authorizations.

The above-described mechanism via which a brand can send its own customer data to the blockchain consent network 356 and have corresponding consent events generated is applicable to a number of potential use cases. Such use cases may include, for example, a scenario in which a brand has acquired another company is merging their data with the data of the acquired company but wants to maintain a record of the source of the merged data. Another example applicable use case may involve a brand importing third party enrichment data from a data broker. The brand may desire to know which user profiles have been enriched. As another example use case, a brand may be consolidating customer data collected from multiple channels such as from their mobile application, online forms, and from trade shows or events. The brand may desire to have consent events generated and attached to user profile to identify through what channel the user consent was received even though the data has been co-mingled.

In example embodiments, brands may utilize the blockchain consent network 356 to address their internal broken or incomplete mechanisms for collecting consent. For example, a brand may have a variety of internal applications and other processes that require people to provide or obtain consent. The brand may also have to demonstrate compliance through reports and audits and must be able to display the consent to the individuals that provided it and allow them to amend the scope/terms of their consent. For example, a brand may ask individuals for consent to allow their aggregate data to be used for tracking efficiency. Consent may be request in-person (e.g., via signature on a digital form presented on a mobile device); by electronic communication (e.g., email); via telephone; or the like. The brand may desire to continue to collect consent via these different channels, but may wish to consolidate the data and centrally track what consent is given and the scope of consent that is given in order to improve efficiency.

In this example scenario, as each application receives consent, an internal service of the brand may generate corresponding consent events on the blockchain consent network 356. The generated consent event may include, for example, the following information: a hashed user identifier (e.g., an internal customer ID for the corresponding channel through which the consent was received); a hashed email for the user; an indication of the scope of the consent; an indication of the source of the consent (e.g., the channel via which the consent was received); a data type to which the consent relates (e.g., analytics); a type of consent (e.g., acceptance or denial); a time period over which the consent is valid (e.g., an expiration date/time for the consent); a short description of the consent (e.g., "Internal Analytics Consent"); and optionally one or more additional descriptive fields. In example embodiments, once the consent event is generated, the user who provided the consent may be able to view the consent event by either visiting a brand-specific UI or a general UI via which consents for multiple brands can be accessed. The user may be provided with the capability to revoke or modify one or more aspects of the consent associated with a consent event.

Still referring to FIG. 3B, in example embodiments, a brand 358 may receive a compliance feed from the blockchain consent network 356 via which an indication of consent events can be provided to the brand 358. Consent events pertaining to the brand 358 may be outputted to an authenticated RESTful endpoint. In some example embodiments, the consent events may be pushed to the brand 358 at periodic intervals. In other example embodiments, the brand 358 may query the blockchain consent network 356 for new/modified consent events over some specified period of time (e.g., the preceding day). In some example embodiments, the compliance feed may be provided as a comma separated value (CSV) file. In other example embodiments, larger/more advanced brands may be able to generate a process for direct ingestion of the data.

In example embodiments, similar to consent event detail requests, the brand 358 may desire to access details of data available (and consented to) for a specific profile (person). Upon receiving an indication of what user data the brand 358 has the user's consent to access, the brand 358 may retrieve the corresponding consented to user data from the user's data vault 362. For example, a consent filter 360 indicative of the scope of the consent/type of user data consented to may be applied to the user data in the user's data vault 362 to retrieve and provide to the brand 358 that corresponding user data to which the consent filter 360 applies.

In example embodiments, similar to the compliance feed, an endpoint may be provided for notifying brands of updated/new profiles and/or data. This feed may indicate the type of data that has changed and may only broadcast profile events for customers who have either new user profiles with the brand 358 or who have existing customer profiles that have given sharing permission to the brand 358. For example, each time a user adds data to their data vault, and the user has a user profile being shared with the brand 358, a notification to the brand 358 may be generated that includes the new data added to the user's data vault, an identifier of the user profile, and optionally, an external identifier (e.g., an internal customer profile identifier for the user maintained by the brand 358).

The above-described mechanisms for generating consent events and providing consent event data to brands ensures that brands will be able to quickly validate whether their existing data is still consented to as well as whether they continue to have consent to access any other data in a user's data vault to which they have previously had consented access. The use of authorization tokens that indicate consent for particular user data and which expire to indicate when the consent is no longer valid provides a more efficient mechanism for validating consent than querying numerous user profiles for details. Moreover, the provision of such authorization tokens via a decentralized consent network (e.g., blockchain consent network 356) allows a brand to be aware of changes in consent even when they occur outside of the brand's control. In addition, using tokens help reduce the number of profiles/amount of data exchange with a brand. In example embodiments, if multiple authorization tokens are received from a brand at once for validation, the response may be verbose (e.g., each token is identified as being valid or invalid); brief (e.g., only the invalid tokens are returned); or a status response (e.g., the brand is informed of how many tokens were searched and how many were determined to be valid/invalid).

In example embodiments, a brand will have a list of all consent event identifiers and/or customer profile identifiers. In some cases, a brand may also request full details of consent events. In such example embodiments, the brand may pass a consent event ID or a group of consent event IDS to an authenticated RESTful endpoint, and in response, a JSON output or the like detailing the full list of attributes for each consent event ID may be provided back to the brand. This may be desirable for the brand in situations where it is not simply seeking to validate the consent event, but needs the details for internal storage or compliance detail requests.

In example embodiments, when a person changes data in their data vault, deletes or revokes access to a data element, or the like, the consent network 356 may send an update notification to web sockets and/or a RESTful API endpoint identifying the person's profile ID and the data element ID or smart contract ID that has changed. In example embodiments, brands may listen for the broadcast (fully automated updates) or periodically query the API for the changed data (scheduled pull automation) and update their records. Brands can also query to return the entire data vault contents (that they still have access to) in order to make sure their whole profile is in sync.

Example use cases to which the above-described mechanism may be applicable may include a scenario in which a brand is sending out a mass communication (e.g., to emails, phone numbers, social handles, etc.); a scenario in which a sales person is calling a sales lead; a scenario in which a bank rep wants to send survey demographics data for branch reporting; or the like. For example, before sending out an email (or other activity using user data), a brand may send the smart contract IDs for the corresponding data elements to the API endpoint. Alternatively, the brand can assemble a list of smart contract IDs on a periodic basis (like all the IDs pertaining to an upcoming email blast), and the API may check to see which IDs have expired (e.g., the has been a change or deletion). The API may reply with list of invalid IDs and may indicate which profiles should be updated or which data is to be deleted.

In some example embodiments, a consent event ID or smart contract ID may serve as authentication token placeholders such that no data needs to be changed by the brand. For example, a brand may store a consent event ID or smart contract ID instead of the corresponding data itself, such that when it comes time to read, display, or act on the data, the brand can retrieve the latest information directly from the existing state in the user's data vault (or no data at all if it has been removed or deleted) based on the corresponding IDs. For example, a brand may have a database column for various data elements, but instead of storing any copy of data, the brand may store the consent event ID and/or smart contract ID as a token value that has an expiration. Then, at runtime (e.g., the point when data is to be used), a brand can request the data from the API endpoint using the stored ID. Then, whatever data is authorized for the brand to have access to is returned.

Figure 3C:
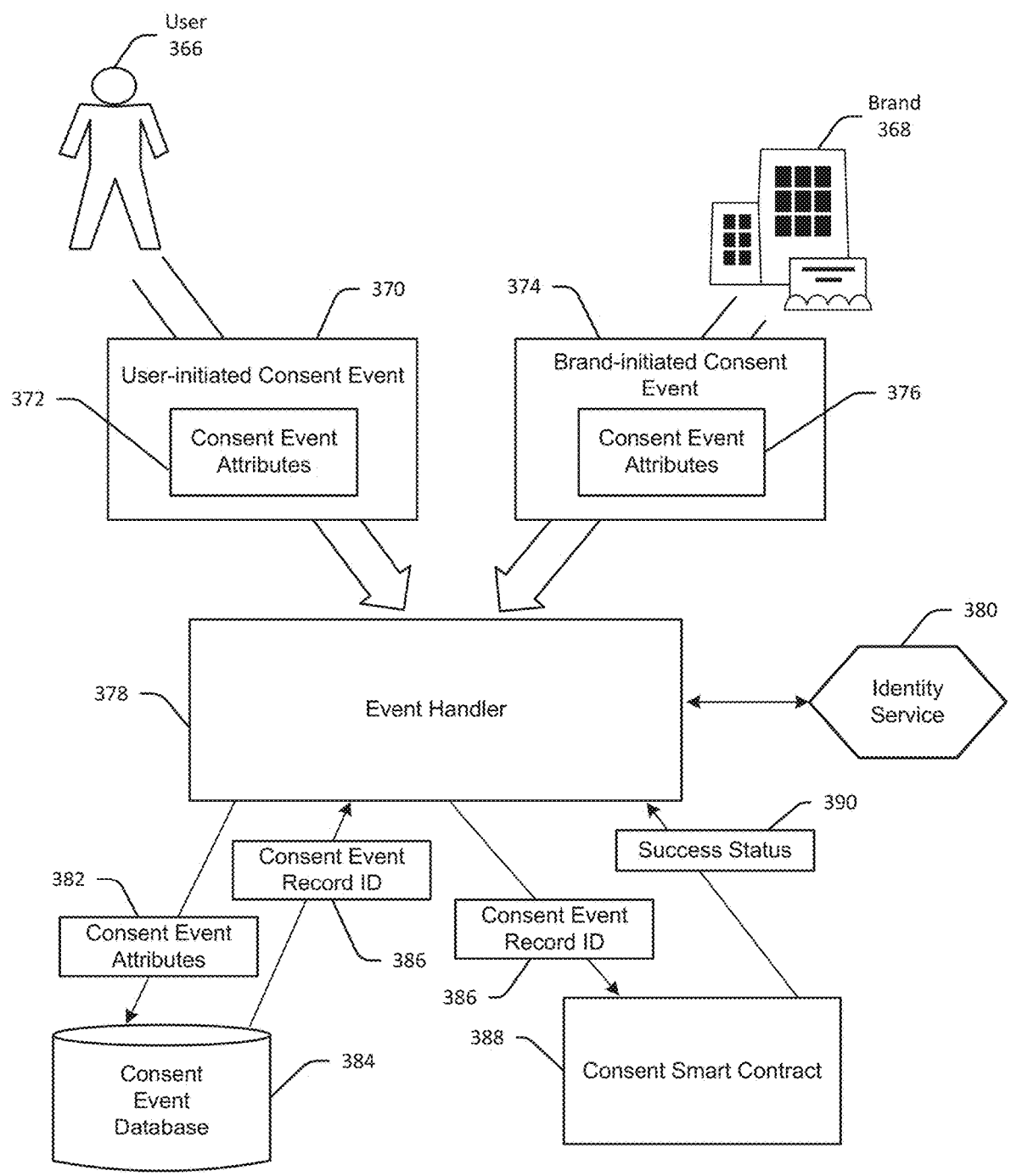
FIG. 3C illustrates an example smart contract lifecycle, in accordance with the embodiments disclosed herein.

FIG. 3C illustrates an example smart contract life cycle in accordance with example embodiments of the disclosure. In particular, FIG. 3C depicts a process by which a smart contract is created based on the occurrence of a consent event. As previously noted, a consent event may refer to an event in which a user content to share at least a portion of user data with one or more third parties is specified. As depicted in FIG. 3C, the consent event may be a user-initiated consent event 370 that is initiated by a user 366. For example, the user 366 may initiate the consent event 370 via a UI provided as part of a brand website. Alternatively, the user 366 may initiate the consent event 370 via a generalized UI that allows the user 366 to establish user data sharing permissions in relation to multiple brands. The user-initiated consent event 370 may include various consent event attributes 372, which may include any of the types of attributes previously described such as, for example, the source of the consent, the user data for which access is consented to, etc. In other example embodiments, a brand 368 may initiate the consent event 374, which may be associated with corresponding consent event attributes 376. For instance, as previously described, the brand 368 may initiate the consent event 374 to ensure that its existing customer data is compliant with the scope of user consent over access to that data, to manage user consents that the brand 368 obtains via multiple channels, etc.

Whether initiated by the user 366 or the brand 368, the consent event 370 or 374 may be received at an event handler 378. The event handler 378 may be in bi-directional communication with an identity service 380. The event handler 378 may be configured to generate a consent event record based on the consent event attributes 382 corresponding to the consent event (e.g., consent event attributes 372 or 376) and store the generated consent event record in a consent event database 384. In example embodiments, the consent event database 384 may form part of a consent network, which in a particular implementation, may be a private blockchain network. The consent event database record that is created may be a consent token, as previously described. The consent event record may contain (and be identifiable by) a consent event record identifier and may additionally contain the consent event attributes 382 corresponding to the consent event 370 or 374.

In example embodiments, the consent event record ID 386 corresponding to the newly created consent event database record may be returned to the event handler 378, which may utilize the consent event record ID 386 to generate a consent smart contract 388. The smart contract 388 may be linked to the corresponding consent event database record via the consent event record ID 386. The smart contract 388 may further include an identifier associated with the brand 368 (either because the brand 368 initiated the consent event 374 or because the consent event 370 relates to consent provided by the user 366 to the brand 368 for access to certain of the user's 366 data); an identifier of the user 366; and the consent event record ID 386. Upon successful creation of the smart contract 388, a success notification 390 may be returned to the event handler 378. In example embodiments, the smart contract 388 and corresponding consent event database record may be used—via the consent event record ID 386 and/or an identifier associated with the smart contract—to notify the brand 368 when the corresponding user consent expires; to validate consent for the brand 368 before the brand 368 initiates customer contact; to enable the brand 368 to renew consent when expiration of the consent is coming close; and so forth.

Figure 4:
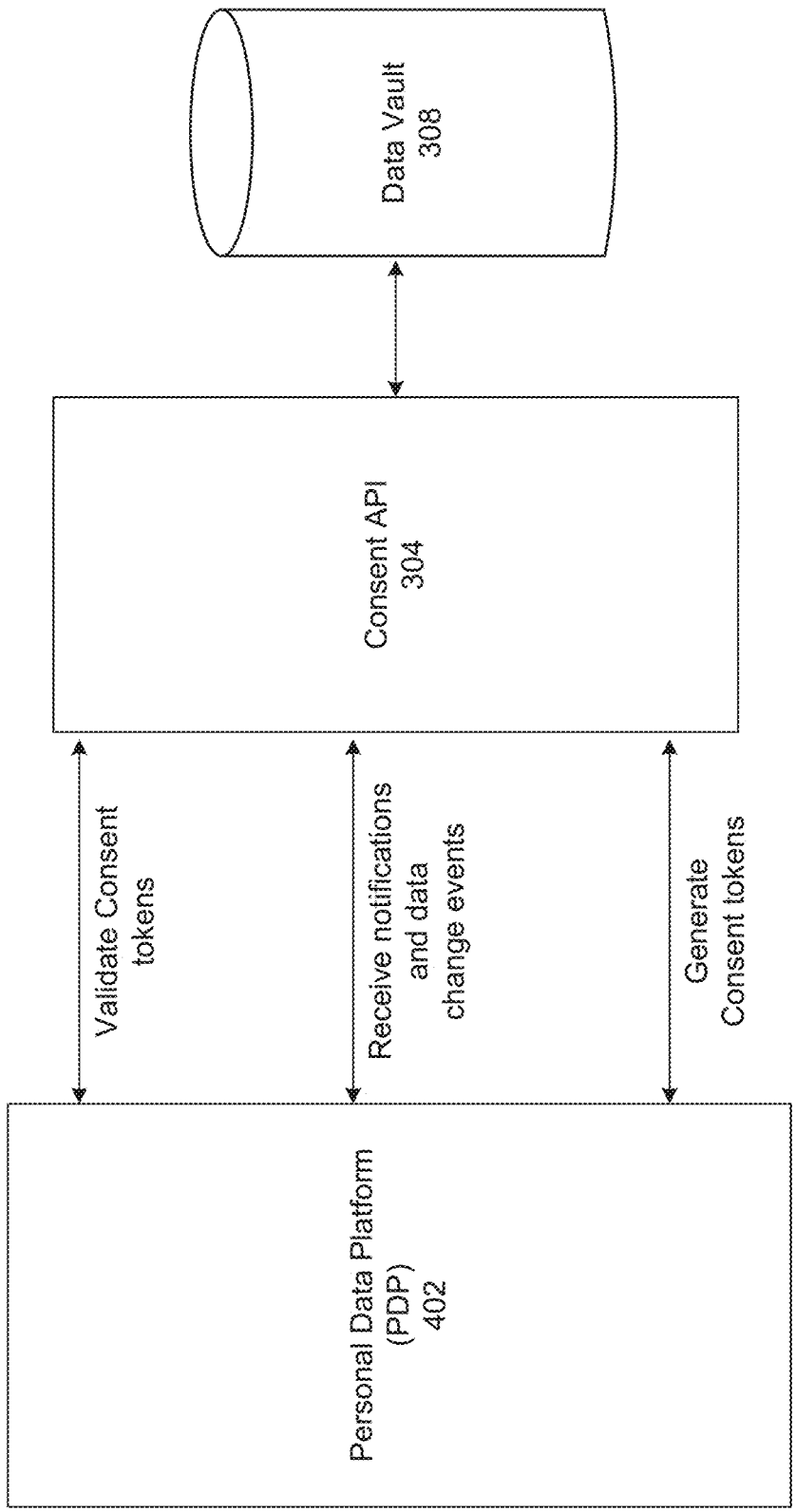
FIG. 4 is an example representation of the recordation of consent records in blockchain consent network, in accordance with the embodiments disclosed herein.
Figure 5:
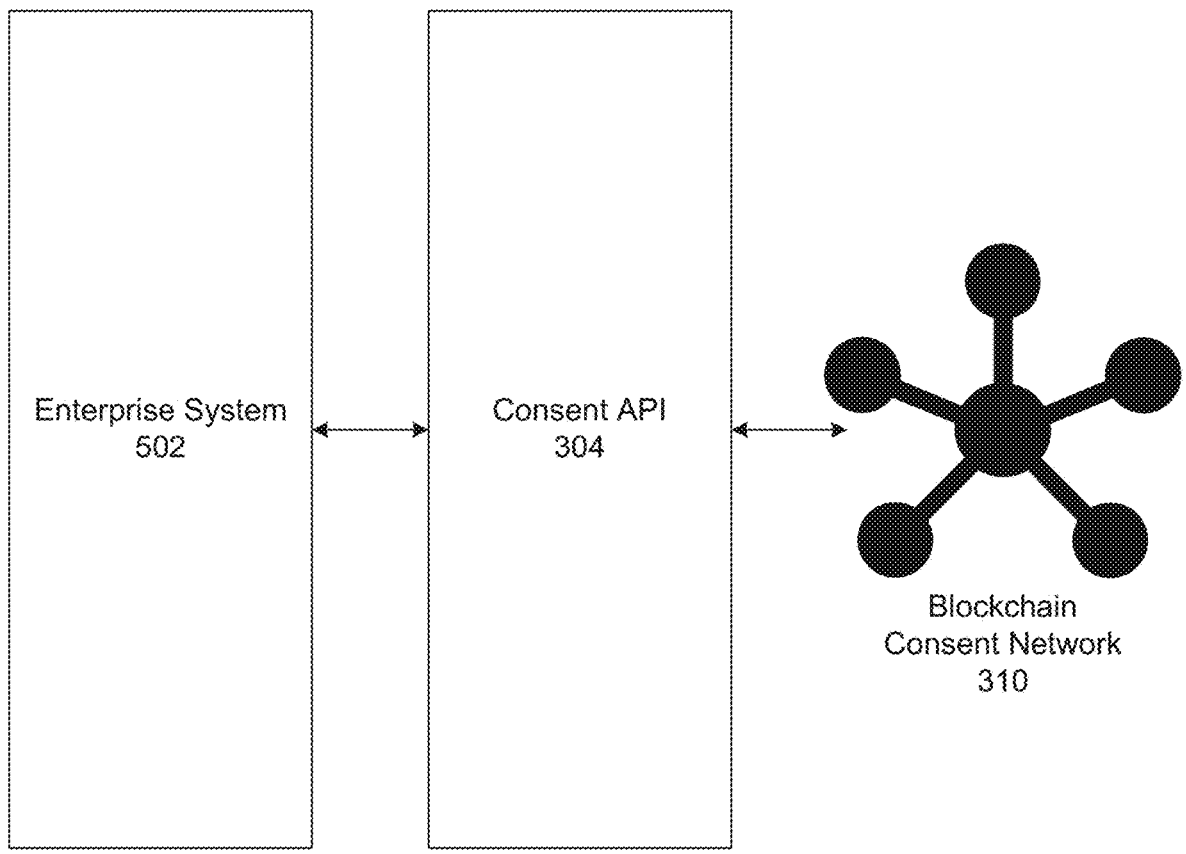
FIG. 5 is an example diagram of enterprise system integration, in accordance with the embodiments disclosed herein.

FIG. 4 is an example consent network flow diagram. In some embodiments, the consent network flow depicted in FIG. 4 may facilitate the storage and distribution of consent data. The consent network may be accessible by end users, for example, via one or more UIs. FIG. 5 is another example consent network flow diagram. As shown in FIG. 5, a consent network (e.g., the example blockchain consent network 310) may be accessible by one or more enterprise systems 502 via the consent API 304. Referring again to FIG. 4, in some embodiments, a personal data platform (PDP) 402 is provided that may be used by end users to grant or revoke consent via the consent API 304.

In some embodiments, an enterprise may collect consent from a user by embedding software into a digital device that enables in-person consent. In some embodiments, in-person consent may allow an enterprise to collect and exchange information related to a user's visit. In-person consent would then be stored in an internal system and attached to an individual's user record. Referring to FIG. 5, an enterprise system 502 may send the in-person consent information to the consent network 310 via the consent API 304 for storage of the consent data in the network 310, and the consent agreement may be available for viewing and management by the individual even after initial consent was given without requiring the end user to communicate with anyone (or any software) at the organization. The enterprise (e.g., a healthcare provider) is thus not required to create any new interface, web site, or application to enable the individual to control the use of their information that was collected by the provider, and the provider is also able to automate removal of user information if the user's consent is revoked through the expiration of the consent token granted at the time of initial consent or if the user actively withdraws consent prior to expiration of the consent token.

When an enterprise attempts to access user data stored in the data vault 308 (or personal data, generally, irrespective of its storage location), the consent network may determine whether the user has granted permission to use the particular type of data for which access is sought (e.g., profiling data contained in an anonymous profiling data record). This determination may include determining whether use of the type of data is permitted, whether the grant has expired or remains active, and/or whether other user-defined settings permit such use. The system may link the anonymized data profiling record to a user identifier if the user has permitted such use. In this manner, a given anonymous profiling data record in the anonymized database may be linked to a user only when a user has granted permission to use at least some portion of the specified profiling data. In some embodiments, an enterprise must validate that it has access to link user data, which allows access to a linkage database that determines linkage information required to link the profiling data to a specific user.

The consent network may take the form of a blockchain network. The system may write data regarding permissions to a block of the blockchain consent network that can be consulted to determine if the user's data can be used for the proposed purpose. The blockchain block may be located using an anonymized record identifier, e.g., specified by an advertiser or external CRM system. In this manner, the blockchain block may be later consulted to identify whether the user's data (e.g., an anonymous profiling data record) may be used at all, may be used to target the user's devices, or may be used to target the user specifically. If the permission is revoked by the user, the link between the anonymous profiling data record and user identifying information may be deleted, thereby erasing any association between the user and the data. In some embodiments, a grant may be revoked by writing a new entry in the blockchain, and the existence of this revocation will cause any links to anonymized profiling data records to be ignored.

In some embodiments, consent flow within the consent network may include interaction between the PDP 402 and the consent API 304. In some embodiments, interaction between the PDP 402 and the consent API 304 may include generating consent tokens as described previously herein. In some embodiments, generating consent tokens may include collecting information to be stored in the consent token. In some embodiments, collecting information may require determining information related to the user data associated with the consent token. For example, the location of the data associated with the access rights of the consent token may be included in the consent token. Information stored in the consent token may further include information that identifies the source (e.g., mobile application, web browser, in-person, etc.) and region (e.g., geographic region) where the consent was given and the consent token generated. For example, if a consent token was generated through an application, the application and geographic region from which the application was accessed may be identified and included in the consent token. In some example embodiments, generating a consent token may include instantiating a data structure of the collected attribute information and sending the instantiated data structure to a blockchain consent network for storage.

In some embodiments, interactions between the PDP 402 and the consent API 304 may include notifications for data change events. In some embodiments, data change events may comprise modifying access rights and permission settings of user data. In some embodiments, data change events may include changing PII. In some embodiments, data change events may include changing profiling data.

In some embodiments, interaction between the PDP 402 and the consent API 304 may include validating consent tokens and writing information to the blockchain. Validating consent tokens may include sending identification information to the consent API 304, which may, in turn, authorize and authenticate an entity and check the blockchain to determine the access rights and permission settings associated with the entity.

In some embodiments, the consent API 304 may include one or more communication channels for writing consent information to the consent network. In some embodiments, consent API 304 may communicate information and execute functionality associated with generating consent tokens, receiving notification and data change events, and validating consent tokens. The consent API 304 may write information associated with these actions to the data vault 308 and blockchain.

In some embodiments, the consent flow may include interactions with the data vault 308 as described previously herein. In some embodiments, data vault 308 may be communicatively coupled with consent API 304 to determine location and access rights to data stored in data vault 308. In some embodiments, data vault 308 may be a decentralized database. The consent API 304 may facilitate determining the location of user data in the data vault 308.

Figure 6:
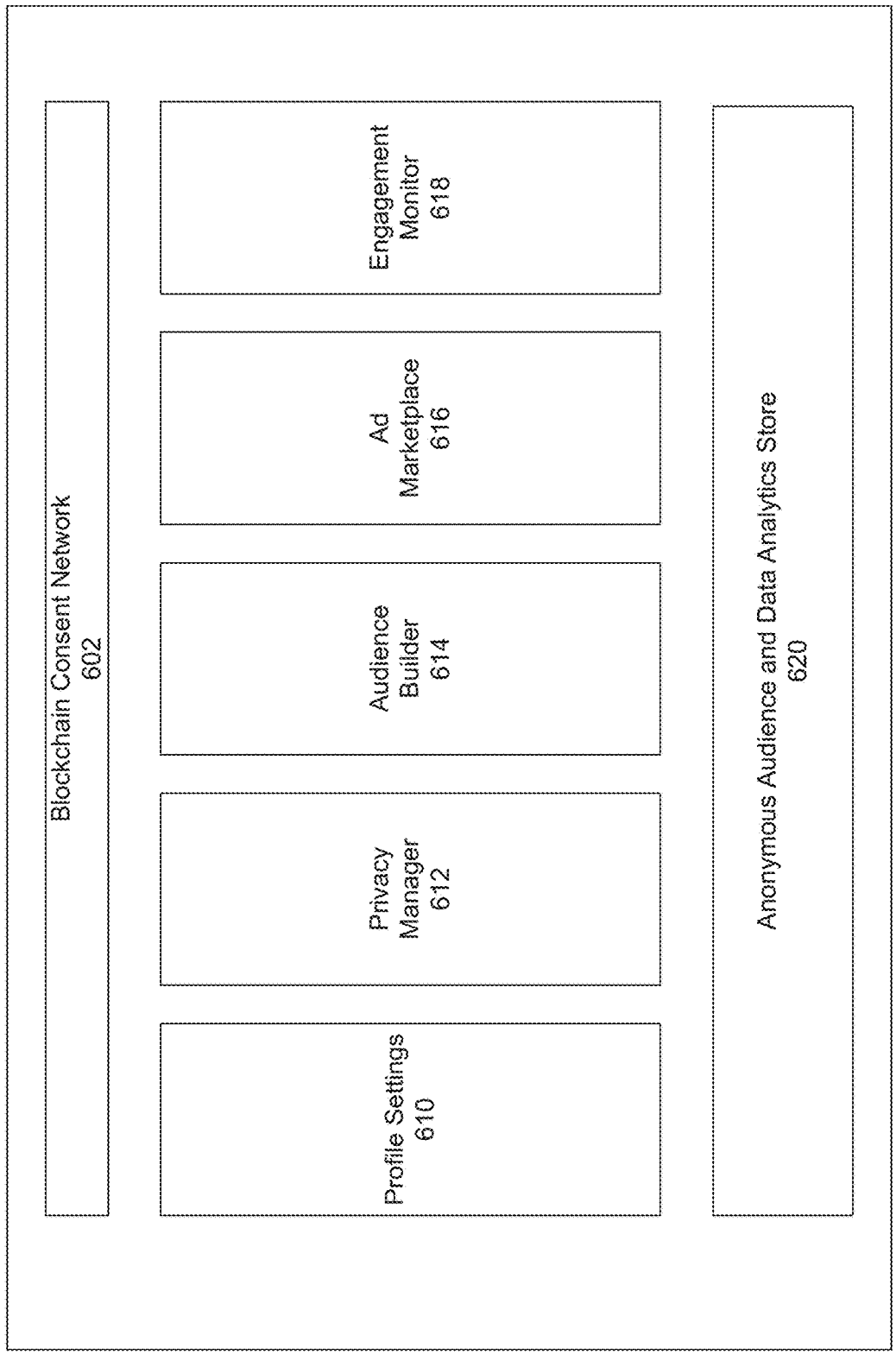
FIG. 6 is an example representation of a system for tracking and securing user data, in accordance with the embodiments disclosed herein.

FIG. 6 is an example representation of a system for tracking and securing user data. In some embodiments, the system 600 may include various UI modules for controlling the use of the user's personal data. In some embodiments, the UI modules may be centralized (e.g., accessed via a web-based dashboard). In other example embodiments, the UI modules may be accessed via a brand website. More specifically, in some embodiments, the system 600 may write information to systems which are distributed and accessed via partner websites, for example, via privacy and rewards tabs or the like accessible via such websites or via any mechanism that permits the user to indicate permissioned uses of personal and other profiling data (e.g., a mobile application). The implementation on a partner's site requires that brand partners include code in their web sites to surface the privacy tab or other UI tool and to interact with the consent API (e.g., consent API 304).

In some embodiments, the UI modules may include a profile settings UI module 610. In some embodiments, the profile settings UI module 610 may display information regarding a user's personal profile in the system 600. In some embodiments, the profile settings UI module 610 may display a form that allows modifications to be made to user profile information. The profile settings UI module 610 may enable users to enter information that is then stored in their corresponding data vaults. In some example embodiments, the profile settings UI module 610 allows users to specify information in a single dashboard that can be used by multiple different enterprise systems (e.g. brand websites). This is an improvement over conventional solutions that gather profile information of a user because a centralized dashboard can distribute the profile settings to a variety of different enterprises without requiring a user to provide such information as input to each individual enterprise system.

In some embodiments, a privacy manager 612 may also be provided. In some embodiments, privacy manager 612 may include an interactive display that enables a user to specify consent to their user data. In some embodiments, privacy manager 612 may allow a user to partition or categorize their data into different groups and selectively specify different levels of consent for the different groupings of data. In some embodiments, privacy manager 612 may invoke the consent API 304 in order to write information specified in privacy manager 612 to the blockchain consent network 602.

In some embodiments, an audience builder 614 may be provided. In some embodiments, audience builder 614 may include tools for browsing the anonymized database 14 and building an audience specification. Audience builder tools may include options for filtering anonymous users of interest so that enterprises may identify and specify users of interest based on the anonymous profiling information. For example, a user may be able to view anonymous data presented to advertisers or marketers based on the access rights and privacy settings consented to in privacy manager 612. Audience builder 614 may display a list of anonymous identifiers (such as unique record identifiers) that are associated with the specified user data.

In some embodiments, an ad marketplace 616 may be provided. In some embodiments, ad marketplace 616 may include different advertising campaigns that are currently being run by enterprises on the system 600. In some embodiments, ad marketplace 616 allows enterprises to market rewards to users in order for them to share their user data.

In some embodiments, an engagement monitor 618 may be provided. In some embodiments, engagement monitor 618 may include information associated with enterprise engagement with specified user data. For example, engagement monitor 618 may display reporting data regarding the enterprise usage of user data. Engagement monitor 618 may have interactive tools that allow a user to associate specific privacy settings associated with how enterprises engage with them. For example, a user may be able to determine that their age and sex data was used in connection with a marketing engagement for clothing.

In some embodiments, the system 600 may include an anonymous audience and data analytics store 620. In some embodiments, anonymous audience and data analytics store 620 includes analytic data that can be purchased by third-parties. For example, an enterprise may perform aggregate analysis of all usage on the system 600. The enterprise may attempt to generate profit for the analysis by selling the report in the anonymous audience and data analytics store 620.

Figure 7:
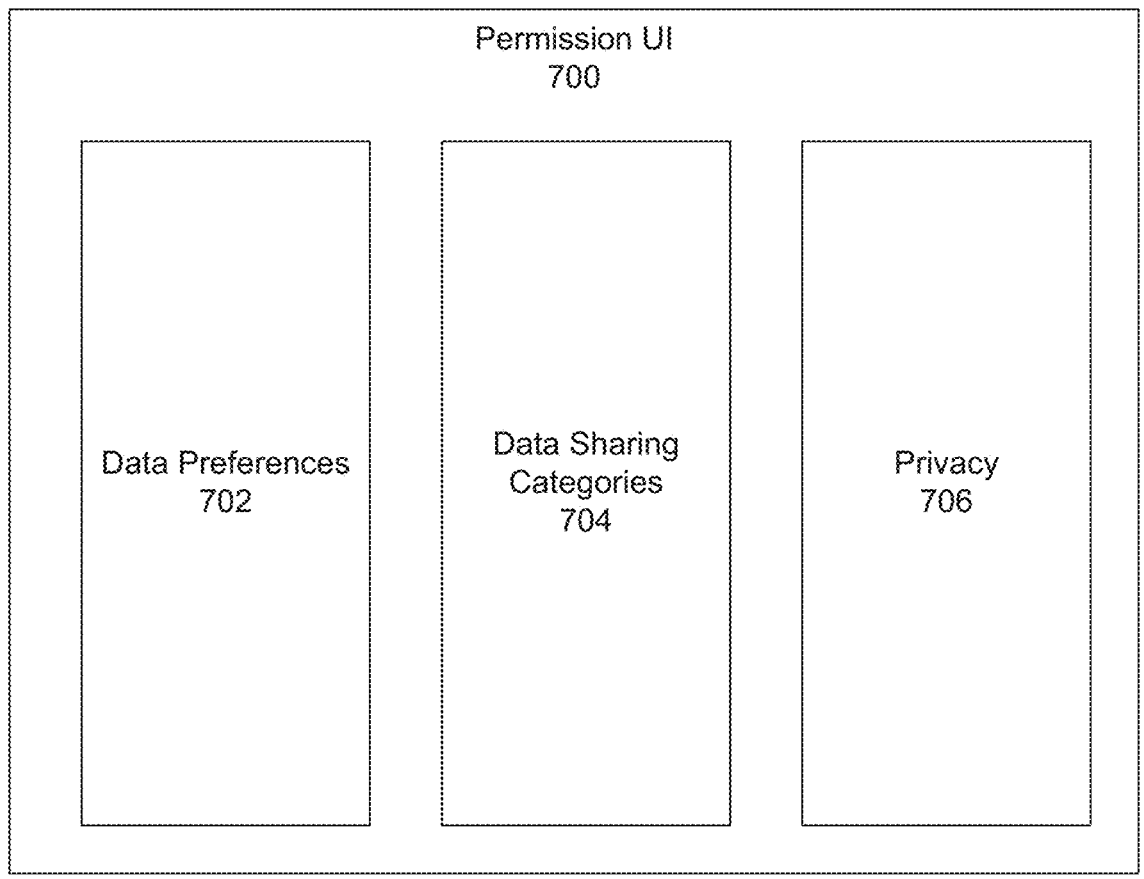
FIG. 7 is an example user interface for permission specification, in accordance with the embodiments disclosed herein.

FIG. 7 is an example user interface 700 for users to specify access rights and permission settings of their user data. In some embodiments, interface 700 may comprise a privacy and rewards tab. The privacy and rewards tab may display a UI wherein the user can indicate preferences related to collection and use of their personal data used for tracking and ad targeting. In some embodiments, UI 700 may display a permission tool, a list of permission types granted, profiling data collected about the user (such as marketing categories), etc.

In some embodiments, user interface 700 may include data preferences 702. In some embodiments, data preferences 702 may include interactive display elements enabling a user to specify consent to the system. In some embodiments, data preferences 702 may enable the user to specify access rights that are application for all enterprises throughout the system. In some embodiments, data preferences 702 may include interactive display elements that allow users to specify access rights for individual brands.

In some embodiments, user interface 700 may include data sharing categories 704. In some embodiments, data sharing categories 704 may include interactive display elements enabling a user to specify consent to specific groups of enterprises. For example, a user may specify that they only want to share their profiling data with enterprises associated with running and fitness. In some embodiments, data sharing categories 704 may include interactive display elements enabling a user to specify consent for specific data type categories of their data. For example, a user may specify that they only want to share location information.

In some embodiments, user interface 700 may include data privacy 706. In some embodiments, data privacy 706 may include interactive display elements enabling a user to specify consent related to data privacy. For example, there may be a radio button where a user can specify whether or not they wish to receive short message service (SMS) messages or other notifications.

Figure 8:
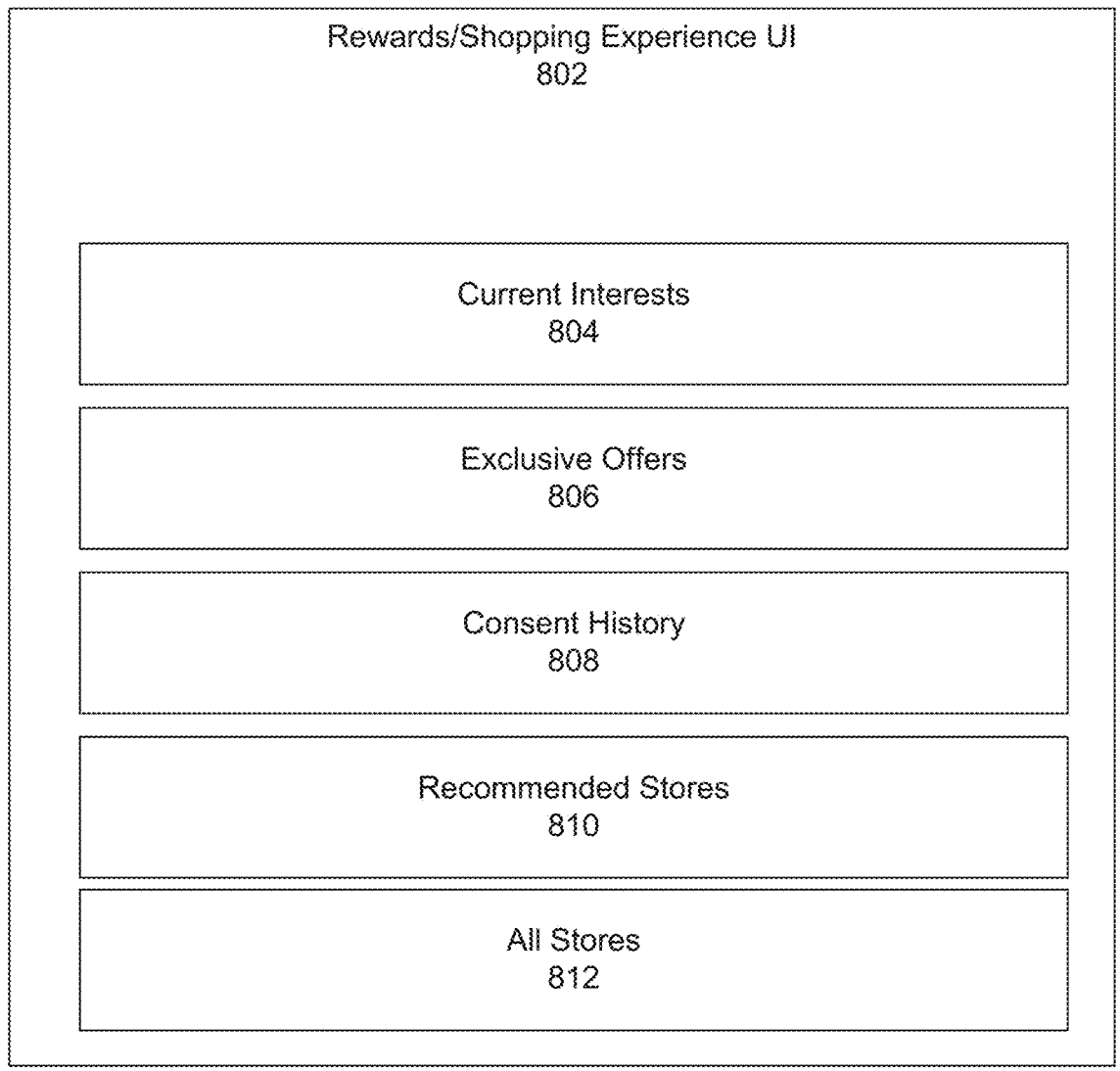
FIG. 8 is an example user interface for rewards and shopping prepared based on data from a user's data vault, in accordance with embodiments disclosed herein.

FIG. 8 is an example user interface 802 for an example rewards and shopping experience. In some embodiments, the user interface 802 for rewards and shopping may be accessed via a privacy tab on a brand partner website, and the preferences and other data may be used to select rewards for display with specific focus on that brand partner. In the case of accessing a centralized dashboard, rewards or shopping opportunities associated with multiple brands may be presented to the user (e.g., reward opportunities which are more relevant to the user's data vault generally across all brands). An example of rewards presented in a centralized dashboard is illustrated in FIG. 8.

In some embodiments, user interface 802 may include a current interests display 804. In some embodiments, current interests 804 may include stored shopping categories the user has identified as interests. In some embodiments, current interest display 804 may include recommended interests based on current interests. For example, current interest display 804 may include interactive elements where highlighted elements are current interests and non-highlighted elements are recommended interests. Users may interact with user interface 802 to modify interests.

In some embodiments, user interface 802 may include an exclusive offers display 806. In some embodiments, exclusive offers display 806 may include featured offers from brands targeted at the user based on the information the user has consented to share. In some embodiments, exclusive offers display 806 enables the user to interact with the featured offers. For example, a user may be able to remove an offer they are not interested in. User interactions with exclusive offers display 806 may be tracked by the system to improve user experience.

In some embodiments, user interface 802 may include a consent history display 808. In some embodiments, consent history display 808 may include information related to historical access rights and permission settings. In some embodiments, consent history display 808 may be presented as a table which is sortable and can be filtered in order for the user to efficiently audit their consent history. In some embodiments, consent history may be populated with historical data retrieved from the blockchain consent network.

In some embodiments, user interface 802 may include a recommended stores display 810. In some embodiments, recommended stores display 810 may include a listing of stores determined by an algorithm as having the highest probability of matching current interests of the user based on data that has been consented to be shared by the user. Recommended stores display 810 may display interactive elements via which the user may indicate sentiment (e.g., 'like' or 'dislike') for a recommended store in the display 810. This information can be used to provide feedback to the algorithm to refine the determination of recommended stores for the user and improve user experience.

In some embodiments, user interface 802 may include an all stores display 812. In some embodiments, all stores display 812 may include a list of all stores in the system. All stores display 812 may have interactive features that allow the user to sort or filter the stores based on a variety of different features. For example, the stores may be sorted in alphabetical order or by the number of purchases the user has made at the store.

Figure 9:
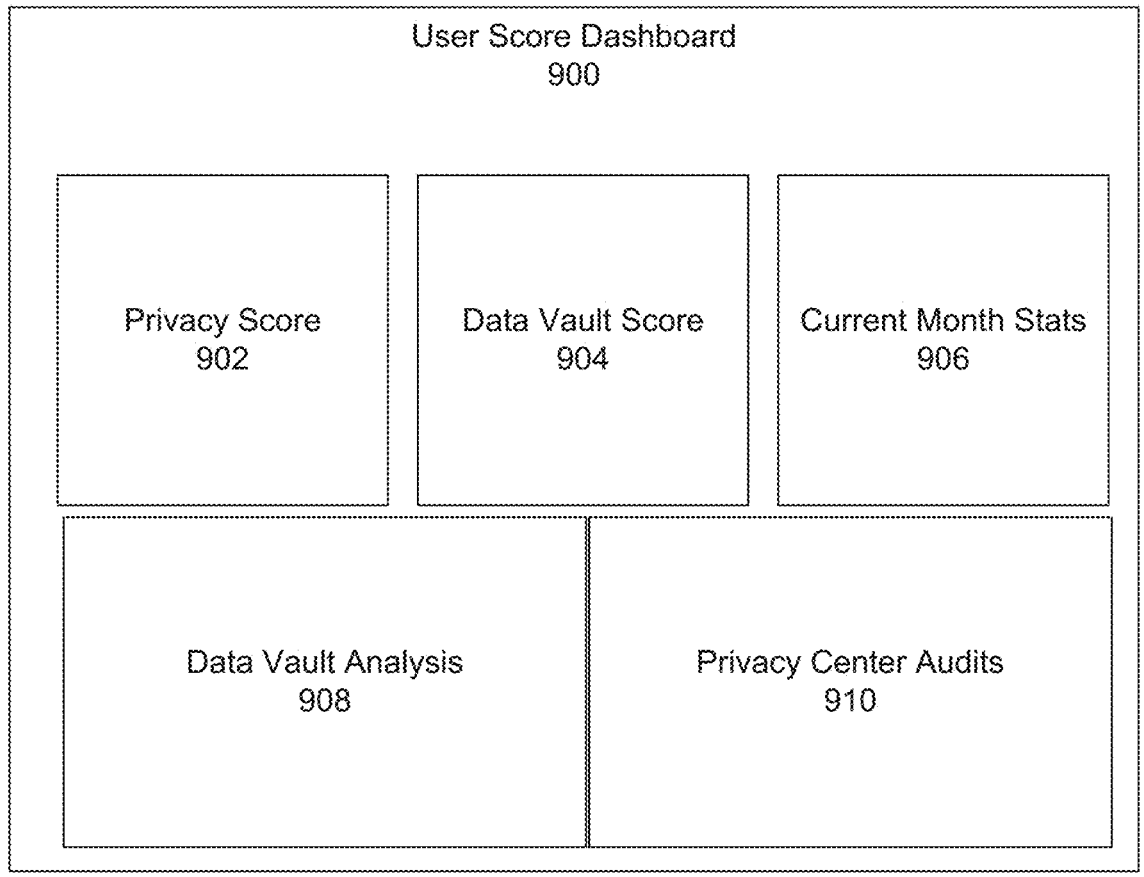
FIG. 9 is an example user score dashboard, in accordance with the embodiments disclosed herein.

FIG. 9 is an example user score dashboard 900. In some embodiments, the user score dashboard 900 may provide one or more scores related to user. In some embodiments, a user's score may reflect a value placed on the user's profile generally, value assigned to one or more data types contained in the profile, value assigned to a specific data set in the user's profile, value assigned to the user's data by a specific brand partner, and so forth. In some embodiments, the user may be provided with more than one score. The user's scores may be adjusted over time based on a variety of factors. For example, a user's score may be adjusted based on the amount and type of data access permissions granted by the user, a click-through rate, a conversion rate, or any other metric of interest. In some embodiments, an advertiser, marketer or other user or entity interested in accessing and using the user's profiling data may determine the algorithm and/or metrics used to generate the user scores. The user scores may be used to implement certain functionality, such as providing the user with rewards or compensation for consenting to access. The user's score may be presented prior to the user granting access, during access, or thereafter. The user's score may take a variety of forms, for example a scaled number (e.g., relative to a community of similar users, the general population, etc.), a dollar figure, a cryptocurrency figure, etc.

In some embodiments, dashboard 900 may include a privacy score 902. In some embodiments, privacy score 902 may be associated with the access rights and permission settings the user has specified. In some embodiments, privacy score 902 is used as a component of an overall user score calculation. In some embodiments, privacy score 902 may display multiple privacy scores based on different user data types. For example, a user may have different privacy scores for their PII and their profiling data based upon the access rights and permission settings they provided to the blockchain consent network.

In some embodiments, user interface 900 may include a data vault score 904. In some embodiments, data vault score 904 may be associated with the value of user data stored in the data vault associated with the user. For example, a user may have very detailed demographic information that is highly valued for advertisers and marketers. In some embodiments, data vault score 904 may display recommendations of data that could be added to the data vault that would improve a user's data vault score. For example, if adding marital status would enhanced the perceived effectiveness of targeted ads, the system may recommend that the user add and consent to sharing that data in the data vault.

As may be appreciated, other features of the description above may be adjusted to these expanded uses of the data vault, e.g., scoring. For example, the contents of the user's personal data store or data vault, including profiling data or other data, e.g., verified status, compliance records, etc., may be scored in addition, in combination with, or as an alternative to, the user's granting of access to the personal data. This may supply the user with additional compensation for permitting businesses to access and use their personal data at varying levels.

In some embodiments, user interface 900 may include current month stats 906. In some embodiments, current month stats 906 may be a display associated with usage data of user data stored in the user's data vault. For example, the current month statistics 906 may comprise the total number of companies that accessed the user's data in the past month.

In some embodiments, user interface 900 may include a data vault analysis 908. In some embodiments, data vault analysis 908 may include aggregate analysis of user data stored in the user's data vault. For example, data vault analysis 908 may provide the total amount of storage associated with a user in the data vault. Data vault analysis 908 may provide visualizations showing, for example, a distribution of the user's data across various groups/categories. For example, a user may be able to view an age group distribution chart showing users across different age groups with similar specified interests throughout the system.

In some embodiments, user interface 900 may include a privacy center audits 910. In some embodiments, privacy center audits 910 may include information regarding audits associated with the user data. For example, privacy center audits 910 may have a list of past audits that were run on the system regarding all the data companies in the system had stored data about the user on their internal systems.

Rewards or other remuneration may be offered or presented to the user in exchange for permission to use some or all of the user's personal data or profile data. The scoring system may be used in a variety of ways as an incentive for people to create, manage and maintain their own information at the time of consent or over periods of time, and as an indicator of higher value rewards. For example, the score(s) may serve to indicate people who are actively engaged with brands, may reflect the recency of information, and/or it may serve to scale rewards based on completeness of information shared overall or to specific brands. The scoring mechanism described herein may deter individuals who may try to exploit the rewards by offering minimal or less valuable information or by sharing data only briefly for a one-time reward and then removing all access.

Variations of scores may be created based on requirements specific to individual advertisers. For example, advertisers that value interests and demographics may generate a minimal score required for rewards as compared to an advertiser that values employment information to find eligible customers for business software.

In some embodiments, the user scoring system may be configured to evolve to accommodate changes in the data type as well as use and value of the data in the data vault. The rewards may be directly linked to the user's grant of the permissions, to the use of the user's profile, to the content of the user's data vault, or a combination thereof. For example, a user that grants permissions to a specific brand partner may be offered rewards by that brand partner as compensation. Additionally, or alternatively, a user that agrees to allow more than one brand, business, or a business type access to and use of data may be rewarded on that basis, e.g., by one of these types of businesses after the user's data has been used or made available for use for a predetermined time. Further, the user's rewards may be linked to the express or inferred interests of the users.

A user may interact with reward or other display elements, e.g., to express interest or disinterest in the rewards, the topics or interests associated therewith, etc. Again, access and use of such data may remain under the full control of the user. Additionally, a user may interact with a displayed reward to understand its source and why it has been presented. This corresponds to a functionality related to auditing or transparency in ad placement, as further described herein.

Figure 10A:
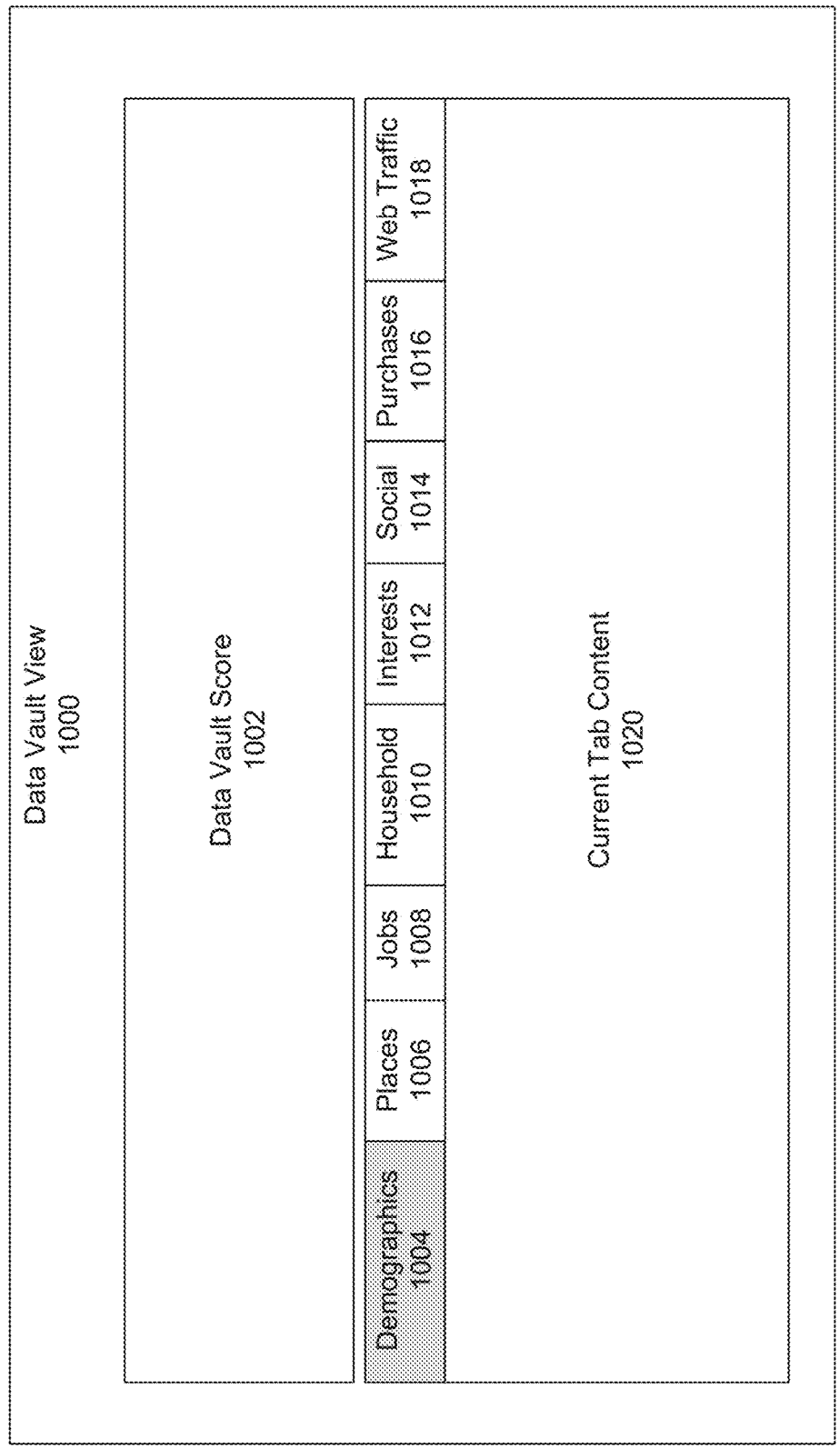
FIG. 10A is an example data vault dashboard in accordance with the embodiments disclosed herein.

FIG. 10A is an example user interface for a data vault dashboard 1000. As described herein, a user-controlled data vault stores information of a user that may be utilized by advertisers and marketers based on consents/permissions given by the user. Further, the user may be permitted to store additional data in the data vault (i.e., more than profiling data). This data may include data that permits use of an identity, such as single-sign-on (SSO), a self-sovereign identity, a set of proofs or certified claims, as well as consent data. In some embodiments, data related to identity that is stored in the data vault is stored in a separate location than the associated profiling data. Thus, there may be categories of data types that are stored in the data vault and which can be controlled by the user. For example, demographics data 1004, places/location data 1006, job data 1008, household data 1010, data pertaining to a user's interests 1012, social media-related data 1014, purchase transactions data 1016, and web traffic data 1018 may be stored in the data vault (directly or in a distributed fashion). These data types, as well as others, can be controlled by specifying access rights and permission settings via the UIs discussed herein. Therefore, the user may associate a consent, e.g., implemented via a consent token recorded to a blockchain, that indicates that a user has consented to the use of the data type. As described, the granularity with which consents are given and revoked may be modified at various levels.

Data stored in the data vault may also include brand-specific information, e.g., data that will only be accessible to the brand that requested the information be added to a person's data vault. For example, an automotive manufacturer may ask which of their car models most interests a specific person in order to personalize her experience or a financial institution may add life event information such as whether or not the person has a child eligible for a college loan. This kind of data may be visible in additional tabs or in a brand-specific view of the data vault. Data specific to a brand means that consent can only be granted to the brand that submitted the data; however the person still retains control of the consent and can deny or revoke access similar to any other contents of the user's data vault.

In some embodiments, user interface 1000 may also display the data vault score 1002 previously disclosed herein. In addition, in some embodiments, user interface 1000 may include the current data tab display 1020. In some embodiments, current data type tab display 1020 may include information related to the current data type tab that is selected (e.g., highlighted) for viewing in user interface 1000.

Figure 10B:
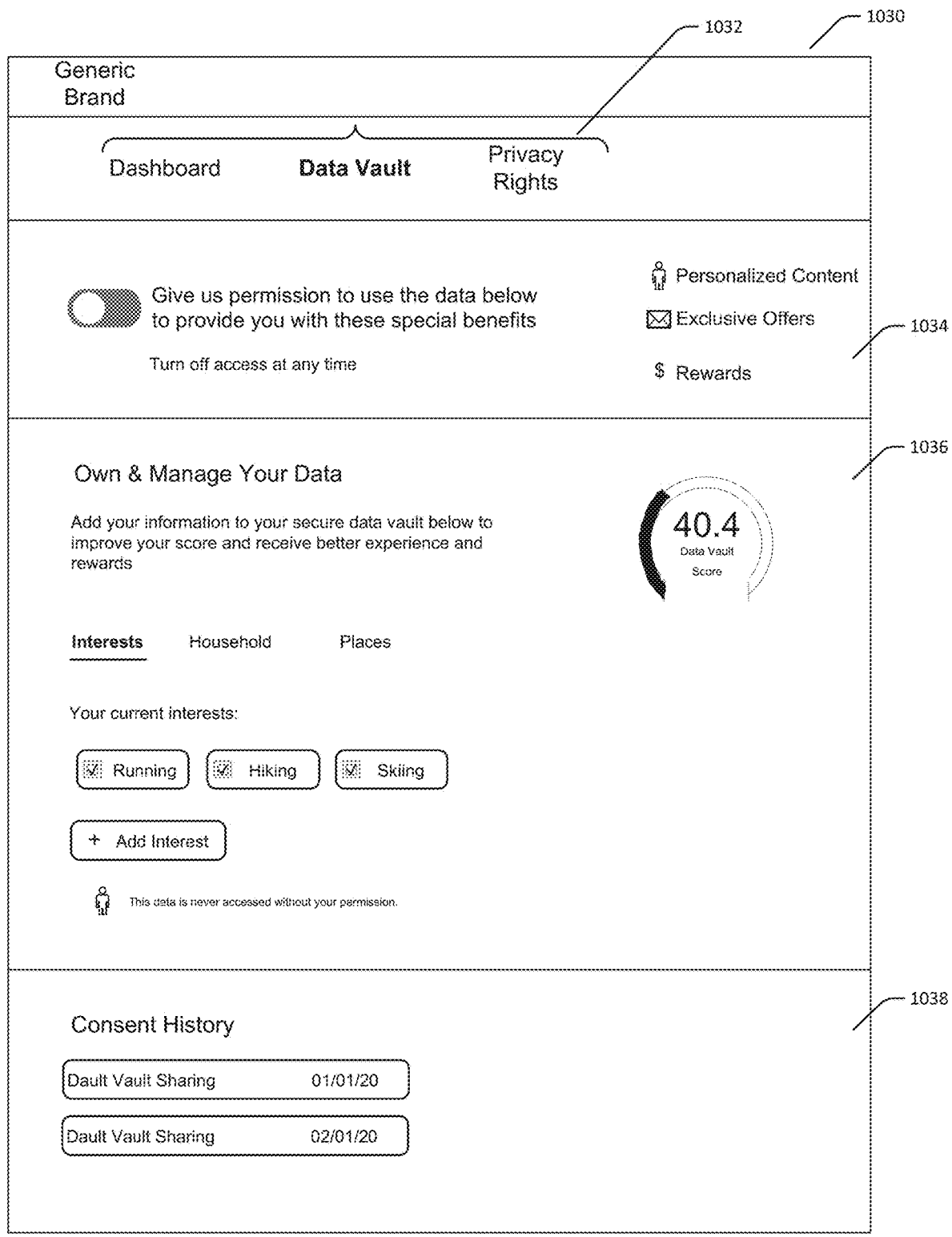
FIG. 10B illustrates example content displayed as part of a data vault tab in connection with an enterprise brand user interface, in accordance with embodiments disclosed herein.

FIG. 10B illustrates example content displayed as part of a data vault tab in connection with an enterprise brand user interface, in accordance with embodiments disclosed herein. A UI 1030 is shown that may be presented in connection with a particular brand's website. In particular, executable code may be provided via a consent API or the like to an enterprise so that the UI 1030 can be presented on the enterprise's website with the branding of the enterprise. In example embodiments, the UI 1030 may include various selectable tabs, buttons, or the like 1032 including, for example, a dashboard tab, a data vault tab, and a privacy rights tab. The UI 1030 is illustratively shown as displaying content associated with selection of the data vault tab.

In example embodiments, the UI 1030 may include a display area 1034 that includes a selectable UI element via which a user can specify data consent permissions for types of data identified in another display area 1036. Within the display area 1036, the user may indicate various data types/data categories for which the user is providing consent for the brand partner to access. In other example embodiments, the user may access a generalized dashboard UI via which the user may specify permissions across a set of brand partners. For example, via such a generalized dashboard UI, a user may specify any combination of permissions such as a permission indicating that some data types are not to be used for any brands, a permission that other data types are generally allowed to be used by any business, and/or a permission that still other data types are to be selectively shared with only certain brand partners. These may be identified in a permissions section of the UI 700, for example, permitting the user to quickly identify permissions that have been given on a per business basis and edit the same (i.e., revoke permissions or change them in some way, such as adjusting a timer that expires the permission after a set time, number of uses, etc.).

Referring again to the brand-specific UI 1030 shown in FIG. 10B, the display area 1036 may identify various user data for which a user has provided consent for the brand partner to access. More specifically, various data categories are identified in the display area 1036. For one or more of the data categories, the user may specify user data that the user may provide consent for the brand partner to access, where such consent can be provided via the selectable UI element in display area 1034. For example, the "interests" category is illustratively emphasized in FIG. 10B, and the specific interests of "running," "hiking," etc. for that category. If the user provides permission via the selectable UI element in display area 1034, the brand partner may gain access to this anonymized user data, specifically, that the user's interests include running, hiking, etc. The display area 1036 may further include an indication of the user's data vault score. In addition, the UI 1030 may include another display area 1038 in which the user's prior consent history may be displayed.

Figure 10C:
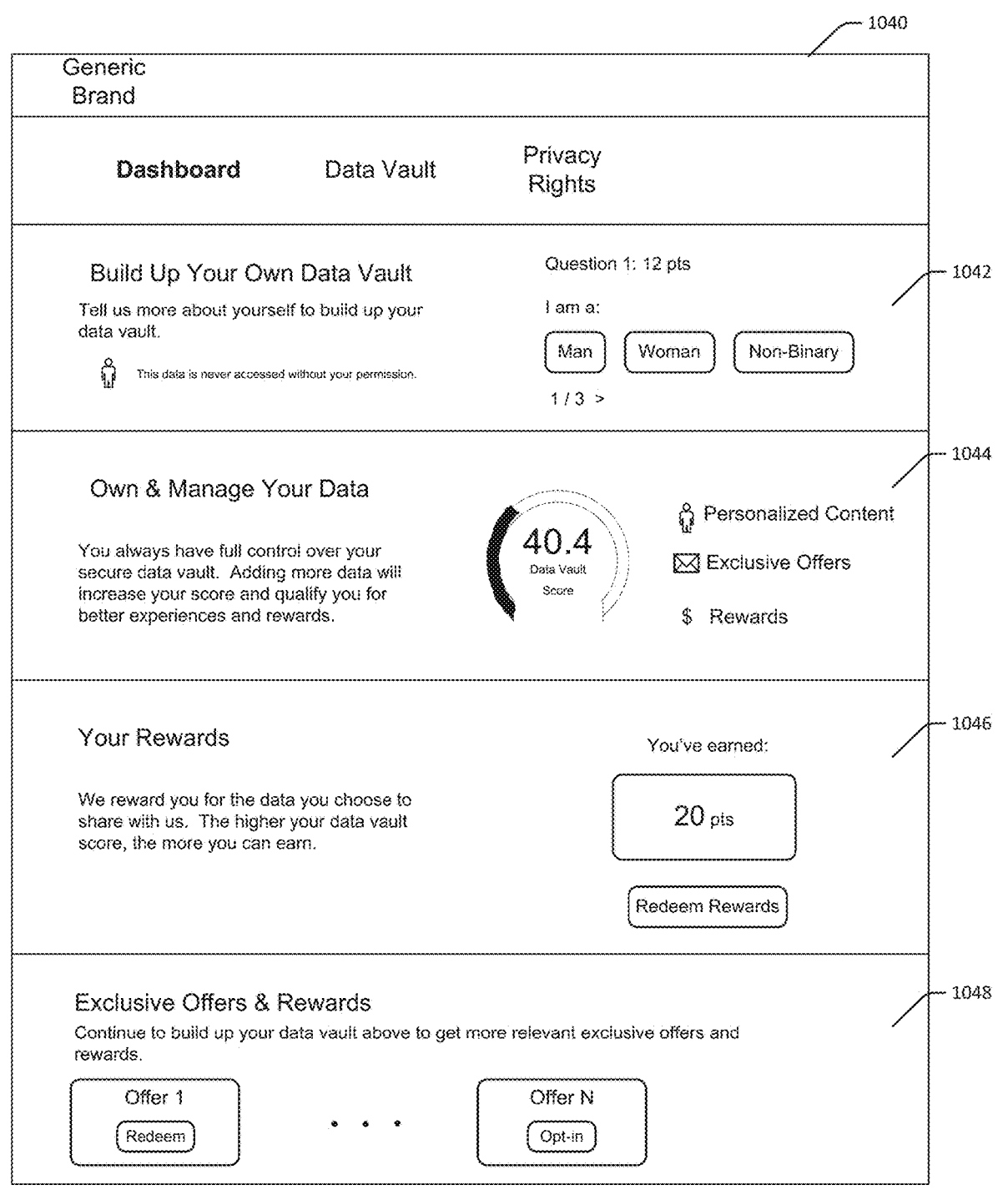

FIG. 10C illustrates example content displayed as part of a dashboard of an enterprise brand user interface, in accordance with embodiments disclosed herein. A UI 1040 is shown that may be presented in connection with a particular brand's website. The UI 1040 may be the same brand-specific UI 1030 of FIG. 10B, but with a different one of the selectable tabs, buttons, or the like 1032 being selected, specifically, the dashboard tab. The UI 1040 is illustratively shown as displaying content associated with selection of the dashboard tab.

In example embodiments, the UI 1040 may include a display area 1042 via which a user may generate additional data for inclusion in the user's data vault. For example, various questions may be posed to the user, and the user's responses may generate profiling data for the user that can be added to the user's data vault. The UI 1040 may further include a display area 1044 that displays the user's data vault score. In addition, the UI 1040 may include a display area 1046 in which the accumulated rewards for the user may be displayed. The display area 1046 may further include a button, widget, or the like that is selectable to initiate a process for redeeming available rewards. The UI 1040 may additionally include another display area 1048 that displays various reward offers available to the user. The reward offers may include offers that are redeemable for gifts, coupons, discounts, or the like. The rewards offers may also include opt-in offers such as an offer to opt-in to an email subscription service via which offers may be periodically sent. In addition, while not shown in FIGS. 10B and 10C, selection of the privacy rights tab may display various privacy information for the user such as, for example, regulatory rules relating to privacy restrictions for the user's data.

Figure 11:
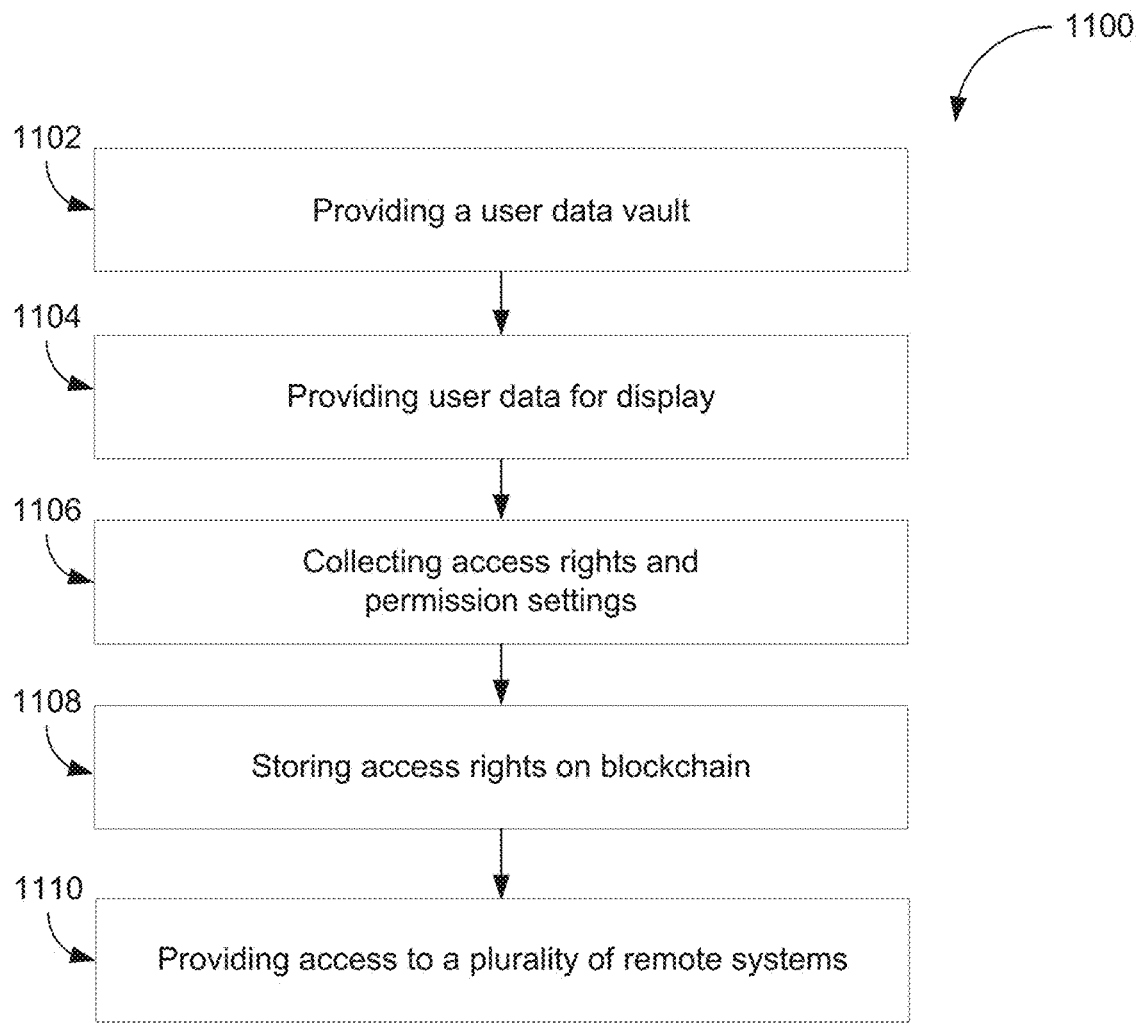
FIG. 11 is an example block diagram of a method for tracking and securing user data, in accordance with embodiments disclosed herein.

FIG. 11 is an example block diagram of a method 1100 for tracking and securing user data. Method 1100 may comprise a set of operations that may occur sequentially or in parallel. In some embodiments, method 1100 may be configured to set access rights of user data through the use of a blockchain-based system. Access rights may be set through consent tokens stored in a blockchain.

In operation 1102, method 1110 may comprise providing a user data vault. In some embodiments, the providing the user data vault may comprise allocating specific storage in the anonymous database and assigning it to a specific user. In some embodiments, operation 1102 may comprise determining the location the data vault from a user identifier. For example, the system may have the location of the user data vault associated with each user in the system. In some embodiments, operation 1102 may retrieve the information in the user data vault to be displayed in operation 1104.

In operation 1104, method 1110 may comprise providing the user data for display. In some embodiments, operation 1104 may comprise of displaying user data in a user interface. In some embodiments, users will be able to modify the user data itself in the user interface. In some embodiments, the user interface may provide interactive elements that enable the user to specify access rights and permission settings regarding the user data in operation 1106.

In operation 1106, method 1110 may comprise collecting access rights and permission settings. In some embodiments, operation 1106 may comprise of sending information collected in a user interface to consent API 304. Consent API 304 may send the collected access rights and permission settings to the blockchain for storage in operation 1108.

In operation 1108, method 1110 may comprise storing access rights on a blockchain. In some embodiments, operation 1108 may comprise execution of smart contracts on a blockchain that were invoked by Consent API 304. The smart contracts may be stored on the blockchain and have functionality that allows for creation, modification, and deletion of access rights and permission settings of user data. In some embodiments, operation 1108 may comprise validating a block in the blockchain network to be distributed to remote system in operation 1110.

In operation 1110, method 1110 may comprise distributing access rights to a plurality of remote systems. In some embodiments, once access rights have been stored on a block in the blockchain, the block is distributed to a plurality of remote systems in the network. In some embodiments, a consensus mechanism is used to determine that the access rights that have been distributed have not been modified or corrupted.

Figure 12:
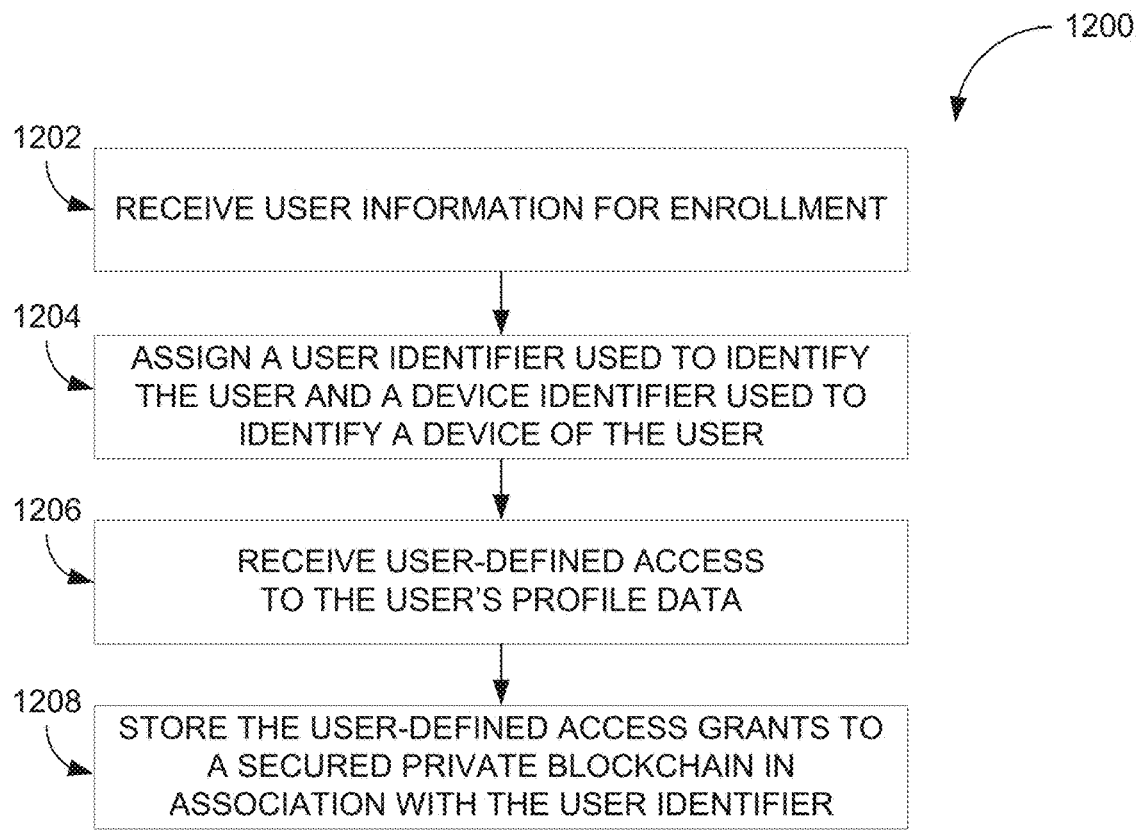
FIG. 12 is an example block diagram of a method for registering a user and generating anonymous identifiers for the user, in accordance with embodiments disclosed herein.

FIG. 12 is an example block diagram of a method 1200 for registering a user and generating anonymous identifiers for the user. In some embodiments method 1200 comprises a process to receive data and specify access rights to the received data.

In an operation 1202, method 1200 may receive user information. The user information may include personal identifying information, profiling information, psychometric information, and/or other information relating to the user.

In an operation 1204, method 1200 may comprise assign the user with a user identifier that the secure private platform uses to identify the user. This user identifier may be used internally by the secure private platform to identify the user and any permissions granted by the user to use the user's profiling data. The user's personal identifying information, demographic information, and/or other private information may be stored in association with the user identifier. The user may also be assigned with a wallet address for a private wallet 122, which may be associated with the user identifier in the system, so that information on the private blockchain 10 relating to the user may be obtained using the wallet address.

In an operation 1204, method 1200 may assign a user identifier for the user and a device identifier for a device (such as user device 120) of the user. The device identifier may be transmitted to and stored at the user device 120 used by the user to enroll. In some embodiments, the device identifier may be stored locally at the device, such as via a browser cookie. When the user device 120 accesses a participating platform such as a website of publisher 150, the user device 120 may provide the device identifier, such as via the browser cookie. The system may then determine whether the device identifier is associated with a user identifier and handle any profiling data according to whether the user has permitted use of this data. If the user uses a new user device to access the website, then the website may request that the user provide the user's user identifier so that the new user device may be assigned with a new device identifier, which may also be linked with the user identifier. In this manner, for each device, a device identifier may be assigned to identify the device. As such, activity on the device (including shopping activity, online browsing activity, geolocation activity, etc.) may be monitored and stored as profiling data, as will be described below. The device identifier by itself cannot be used to identify a user. The device identifier(s) and the user identifier are not stored in association with one another unless the user has granted permission to use the user's profiling data. In this manner, if the user has not granted such permission, the profiling data associated with the device identifier cannot be linked with a specific user. In some embodiments, the system may associate specific permissions with specific devices. For example, the user may specify that profiling data derived from one device of the user may be used, while profiling data derived from another one of the user's devices may not be used.

In operation 1206, method 1200 may comprise receiving user defined access grants to user data. In particular receiving user defined access grants to user data may comprise collecting consent information from a user interface. For example, privacy manager may display a variety of different forms, options, and other interactive elements that enable a user to specify access grants to user data. In some embodiments, consent API 304 may receive the access grants to user data in the user interface and send it the private blockchain 10.

In an operation 1208, method 1200 may comprise storing the user-defined access grants to the private blockchain 10 in association with the user identifier. In particular, the user-defined access grants may be stored in the private blockchain 10 in association with the user's wallet address. For example, the data grant manager 32 may store the grants in the private blockchain 10 in association with the user identifier (or more particularly, in association with the user's wallet address for the private blockchain). For instance, based on input through the user-facing applications 20, the data grant manager 32 may write a specified grant to a blockchain transaction, which may be included in a block of a distributed ledger of the private blockchain 10. The distributed ledger may encrypt any personal identifiable information using public key and private keys. Thus, the distributed ledger may securely store identifying information about the user and the user's settings with respect to what types of user data may be used about the user, but not the profiling data itself. In this manner, third parties will not have access to any of the profiling data or personally identifiable information unless the user permits such access via a user setting. As such, none of the profiling data or personal identifiable information is exposed to the public unless permitted by the user, while maintaining an immutable record of the user's settings that permit (or deny) the use of the user's personal identifiable information and behavioral data. The user may later view and modify the user's settings such as using the private wallet 122, and any changes may be recorded to the private blockchain 10.

Figure 13:
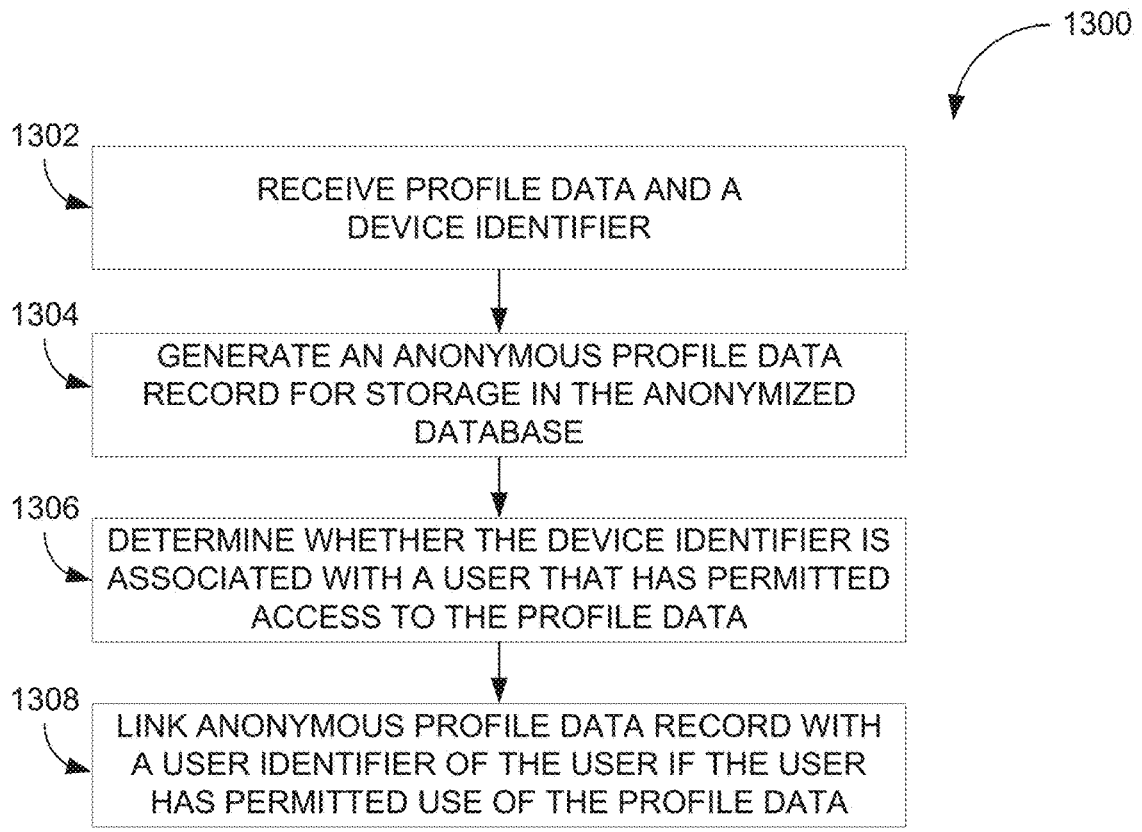
FIG. 13 is an example block diagram of a method for generating anonymized profiling data, in accordance with embodiments disclosed herein.

FIG. 13 is an example block diagram for a method 1300 to generate anonymized profile data. In some embodiments, method 1300 may comprise of determining the linkage between decoupled data in order to re-identify user data for use in the system.

In an operation 1302, method 1300 may include receiving profiling data and an anonymous identifier such as a device identifier. A brief overview of how the profiling data is generated will be described. In operation, a user registered to use the system may conduct activity on a user device 120 that includes one or more agents 126. The one or more agents 126 may include programs that monitor activity on the user device 120 and report this activity to the computer system 110. For example, an agent 126 may include a browser extension, a mobile application, a platform-specific application (such as an electronic shopping application), and/or other types of user application that can report user activity that may be used as profiling data. As one example, the browser extension may be configured as a script that transmits browser history information and a device identifier to the computer system 110, which stores the browser history information anonymously linked to the device identifier in the anonymous database 14. Other agents 126 may monitor and provide other types of profiling data.

In some embodiments, the one or more agents 126 may store the device identifier of an enrolled device. If a device identifier is not stored, the agent 126 may determine whether the device is enrolled to use the system. If so, then the device identifier may be obtained from the secure private platform and stored as a cookie. If the agent 126 determines that the device is not enrolled to use the system, the agent 126 may request that the user enroll the device, as described above. The agent 126 may transmit the profiling data along with the device identifier, which is received at operation 402.

In an operation 1304, method 1300 may include generating an anonymous profiling data record containing a unique record identifier and the profiling data. The unique record identifier may be generated to uniquely identify the anonymous database record. The anonymous database record may be stored in anonymized database 14. As such, by themselves, anonymous profiling data records in the anonymized database 14 cannot be linked to any user.

In an operation 1306, method 1300 may include determining whether the device identifier is associated with a user that has permitted use of the type of profiling data contained in the anonymous profiling data record. In some embodiments determining whether the device identifier is associated with a user comprises validating a proof, such as a zero knowledge proof. For example, a validator entity may have access information in the consent blockchain network such as a consent token. An entity may check the blockchain consent network before attempting to link anonymous profile data to a user identifier. In some embodiments, the prover is provided a value in which the validator entity can confirm is correct to determine whether the user permitted the linkage of data. Using a proof-based system such as zero-knowledge proofs is a security improvement over traditional solutions as it allows entity's to validate correctness without exposing any of the data used to validate.

In an operation 1308, method 1300 may include linking the anonymous profiling data record to a user identifier if the user has permitted such use. As previously noted, if a user has granted permission to use the user's profiling data, a link between a user identifier and the user's device identifier may be stored. In some embodiments, the link may be stored in a smart contract that also stores or otherwise consults the user-defined grants. When the profiling data and device identifier are received from the agent 126, the data grant manager 32 may identify a user associated with the device identifier and grants from the user (or a smart contract that is associated with the device identifier). The data grant manager 32 may determine whether the user has previously permitted use of the profiling data. This determination may include determining whether use of the type of incoming profiling data is permitted (for example, if the type of profiling is web browsing, whether the user has granted access to web browser data), whether the grant has expired, and/or whether other user-defined settings permit such use.

In some implementations, the system may include write the unique record identifier from the anonymous profiling data record, the user identifier, and a grant transaction identifier to the private blockchain 10. For example, if the user has permitted use of the profiling data, the data grant manager 32 may generate a private blockchain transaction that contains the unique record identifier, the user identifier, and a grant transaction identifier that uniquely identifies this transaction. This private blockchain transaction may be written to a distributed ledger of the private blockchain 10 and later consulted to identify the user in the event that the anonymous profiling data record associated with the unique record identifier is matched with an audience definition from an advertiser 140, as will be discussed below. In this manner, a given profiling data record in the anonymized database 14 may be linked to a user only when a user has granted permission to use either all or specified profiling data. If the permission is revoked by the user, the link may be deleted, thereby erasing the linkage between the user identifier and the device identifier. Thus, any anonymous profiling data record cannot be linked to a user. In some embodiments, this functionality may be encoded as a smart contract so that creation or deletion of a link is automatic upon user input and is transparent so that users and others can verify this functionality.

In some embodiments, the data grant manager 32 may generate a public blockchain transaction that contains the grant transaction identifier, a date of the grant of access to the anonymous profiling data record, type of personal identifiable information permitted to be used (if applicable), a duration of the grant, and/or other information for public access and transparency. The data grant manager 32 may write the public blockchain transaction as to the public blockchain 12.

In some embodiments, the user's public and/or private wallets may provide access for the user to view or modify the user-defined settings. For example, the data grant manager 32 may receive a request to revoke a grant. Such revocations may affect future and previous grants to use profiling data. The revocation request may be to revoke a general grant (such as a previous grant to email the user). In this case, the grant will be removed. If written to the private blockchain 10, for example, a new block may be written that revokes any previous grant. Alternatively, the block containing the original grant may be burned in a private blockchain. If the revocation request relates to a specific grant transaction identifier, then the particular grant for that grant transaction identifier may be revoked in a similar manner by revoking the block in the private blockchain 10 pertaining to the grant transaction identifier. Doing so will "orphan" the corresponding anonymous profiling data record since it will no longer be linkable to a user. In some embodiments, revocations will be enacted upon expiration of a grace period after a revocation request has been made. In this manner, a user may rollback or cancel a revocation request before this grace period expires. In some implementations, if a user deletes an agent operating on the user device 120, data relating to that device may be orphaned. If the agent is re-installed on the user device 120 and the user signs in with the system-generated user identifier, the profiling data may be re-linked with the user if the device identifier has been retained on the user device. However, if the device identifier has also been removed from the device, and a new device identifier is assigned to the user device 120, the previous profiling data associated with the device may be permanently orphaned.

Another aspect of the systems described herein is that users are able to participate, earn rewards, and manage their consent without being required to immediately register or create user accounts/profiles with a brand. This substantially removes the barrier to participation for users. However, once a user does provide information that matches a previously created profile, ownership is established.

Figure 14:
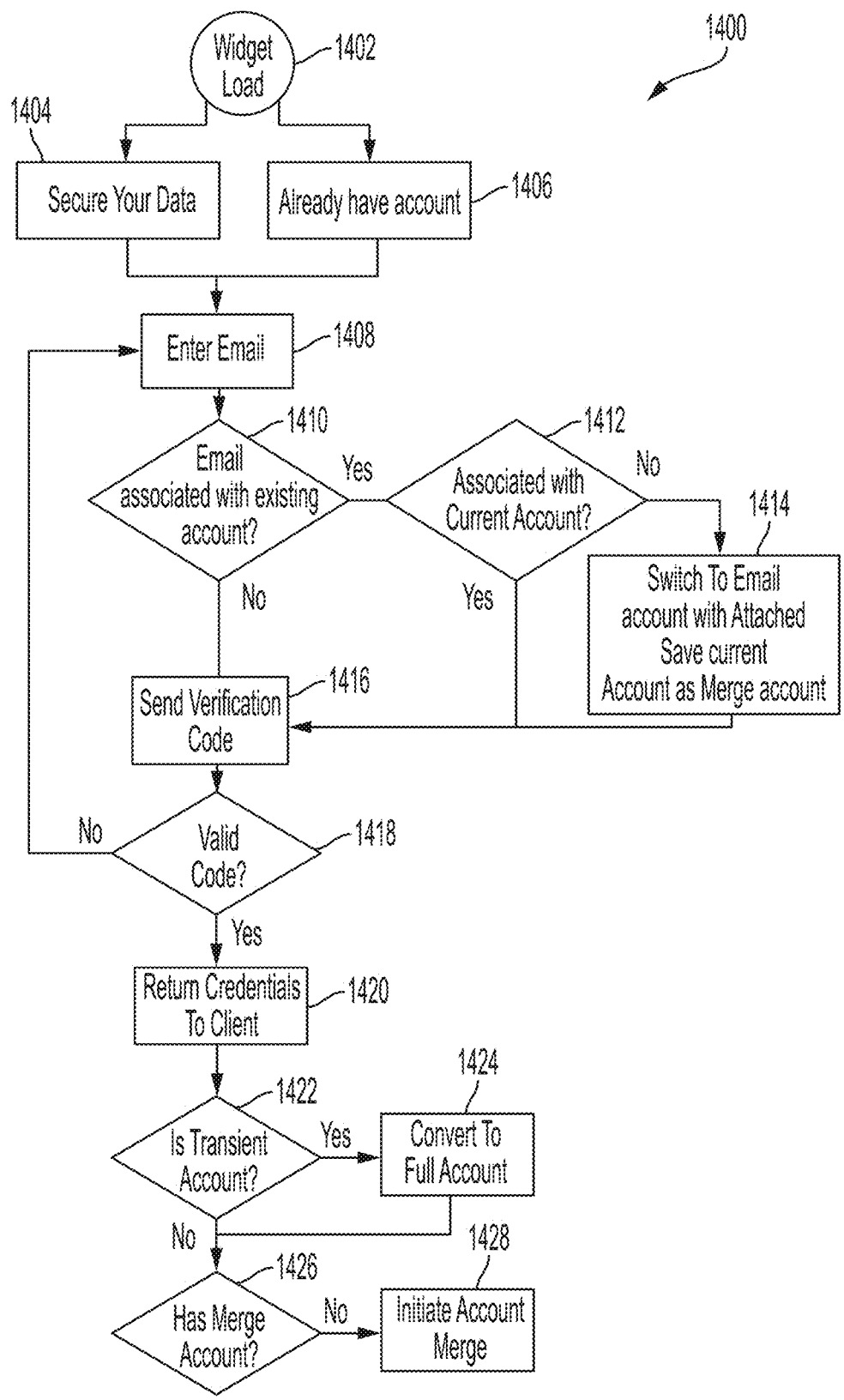
FIG. 14 is an example block diagram of a method for converting anonymous user accounts into full user accounts, in accordance with embodiments disclosed herein.

FIG. 14 is a process flow diagram of an illustrative method 1400 for converting transient (anonymous) user accounts to full user accounts. The primary differentiator between transient user accounts and full user accounts is control of the account credentials. Transient accounts are not controlled by a user and can only be accessed as long as the cookie containing the credentials is stored by a web browser. Full accounts have a verified email associated therewith and potentially a password that allows the owner to verify credentials to access the account.

At block 1402 of the method 1400, a widget load may occur. The widget load may be, for example, a loading of a log-in page or the like of a UI. At block 1404 of the method 1400, a user may be provided with a capability to secure her data in, for example, a data vault. At block 1406 of the method 1400, a process for determining if the user already has an established account may be initiated.

At block 1408 of the method 1400, the user may be prompted to enter their email. While method 1400 is illustratively described in connection with an email address as a user profile/account identifier, other identifiers (e.g., a designated nickname) are possible as well. At block 1410 of the method 1400, a determination may be made as to whether the inputted email is associated with an existing account. In response to a positive determination at block 1410, the method 1400 may proceed to block 1412, where a determination may be made as to whether the inputted email is associated with the current account. In response to a negative determination at block 1412, the method 1400 may proceed to block 1414, where a switch may be made to the user account associated with the entered email, and the current account may be saved as an account to be merged. From block 1414, the method 1400 may proceed to block 1416. The method 1400 may also proceed to block 1416 in response to a negative determination at block 1410.

At block 1416 of the method 1400, a verification code may be sent to the email address provided by the user at block 1408. At block 1418 of the method 1400, a determination may be made as to whether the user has provided a valid verification code. In response to a negative determination at block 1418, the method 1400 may return to block 1408, where the user may be again prompted to enter an email. On the other hand, in response to a determination that the user has provided the correct verification code (a positive determination at block 1418), the method 1400 may proceed to block 1420, where corresponding user account credentials may be returned to the user.

At block 1422 of the method 1400, a determination may be made as to whether the current account is a transient account. In response to a positive determination at block 1422, the method 1400 may proceed to block 1424, where the transient account may be converted to a full account. Conversion to a full account may include, for example, changing the username on the account to the user's email address; removing user credentials from a transient account table; and updating status of the account in the identity-service as not transient and adding the user's email as an alias.

From block 1424 as well as in response to a negative determination at block 1422, the method 1400 may proceed to block 1426, where a determination may be made as to whether there exists an account for merging. For example, when the current account is a transient account, and a user authenticates with a different full account, the transient account may be merged into the full account at block 1428 of the method 1400. If neither of the two accounts are transient (a negative determination at block 1426), no merge occurs, and the user is authenticated to the account that the email was verified on. Merging of a transient account into a full account may include deleting the transient account; invoking the identity service asynchronously to merge the accounts; transferring all aliases from the transient account to the full account into which the transient account is being merged; adding a TransientId as an alias to the full account; adding all ServiceDataIds full account; and notifying all services with DataIds of the merge (asynchronously) such as a consent service, data vault, etc.

A technical benefit of the present disclosure is the enhanced security of using a distributed system that enables a user to build and maintain a data vault that stores anonymous data associated with themselves while also maintaining modular control of and efficient use of the data via consent tokens. The distributed system described herein also enables users to control access to their data across multiple brands, sites, and applications by specifying access on a centralized dashboard that gets distributed throughout the network. The distributed an decoupled nature of data storage in the system enhances the security and privacy of user data. The administration user interface improves the control of access rights and privacy settings to external entities accessing their data. Furthermore, the present disclosure utilizes blockchain technology to create an fault-tolerant indelible log of activity throughout the system, incentivizing all parties to act in good faith.

Furthermore, the blockchain consent network, which stores consent tokens that determine access rights and permissions, will assist in performing remote updates to data. For example, a user can update data in the vault with the Company, such as permission data (consent, revoke), compliance data, status data, contact data, etc., and these changes can be forwarded to or discovered by the appropriate parties, e.g., via association of the consent token. This is an improvement over traditional methods for updating, deleting, etc. (CRUD) in databases as it requires explicit login access to a server. Allowing users to update their data in the data vault, with changes recorded on a blockchain or other decentralized authority, permits databases to be updated in a decentralized and remote fashion, enhancing the security and privacy of user data, while increasing the transparency of the usage and access of that data.

Terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Each of the processes, methods, and algorithms described in the preceding sections may be embodied in, and fully or partially automated by, software components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some embodiments shall not be read to mean that the narrower case is intended or required in instances where such broadening phrases may be absent.

The invention claimed is:

1. A computer-implemented method for tracking and securing user data, the method comprising:
   providing a user data vault that stores user data associated with a user, wherein the user data comprises first data associated with a user identifier related to the user and second data associated with an anonymous identifier, wherein the first and second data comprise the same information;
   providing an administration user interface that displays the first and second data;
   collecting, from the administration user interface, permission settings for the first and second data;
   storing the permission settings on a ledger of a blockchain consent network;
   creating a system linkage between the first data and second data based on the permission settings;
   determining that a remote device is authorized to access the first or second data based at least in part on the permission settings; and
   providing, based on the access determination, the remote device with access to the first or second data.

2. The computer-implemented method of claim 1, wherein the first data comprises one or more of personally identifiable information, contact data, identity data, certified claim data, or social media account data.

3. The computer-implemented method of claim 1, further comprising:
   providing the remote device with executable code via a consent application programming interface (API), wherein the executable code is executable at the remote device to enable presentation of a brand user interface via which the provided first or second data is displayed, and wherein the brand user interface is associated with a partner brand.

4. The computer-implemented method of claim 3, wherein the brand user interface:
   displays a partner brand reward associated with partner brand; and displays a user score for the user data vault, wherein the user score is associated with a value, to the partner brand, of the first and second data to which the partner brand has access rights.

5. The computer-implemented method of claim 4, wherein the brand user interface further includes a link to redeem the partner brand reward in the form of a virtual currency.

6. The computer-implemented method of claim 3, wherein displaying the data on the administration user interface comprises displaying a first score representative of the value of the first data and a second score representative of the value of the second data.

7. The computer-implemented method of claim 3, further comprising combining data collected from the brand user interface into a unified dashboard view, wherein the dashboard view is dynamically updated based at least in part on interaction of the user with the brand user interface.

8. The computer-implemented method of claim 3, further comprising storing, on the ledger, an authenticated grant of permission by the user for a requesting system associated with the partner brand to access the user data vault, wherein the user receives a reward correlated to a level of permission granted by the user.

9. The computer-implemented method of claim 1, wherein the administration user interface comprises:
an identification of a plurality of partner brands; and
an identification of a respective set of brand-specific data access rights and permission settings associated with each of the plurality of partner brands.

10. The computer-implemented method of claim 1, wherein storing the permission settings on a ledger of a blockchain consent network comprises storing the permission settings in the form of a smart contract.

11. A system for tracking and securing user data, the system comprising:
a computer system having one or more physical processors programmed with computer program instructions that, when executed by the one or more physical processors, program the computer system to:
provide a user data vault that stores user data associated with a user, wherein the user data comprises first data associated with a user identifier related to the user and second data associated with an anonymous identifier, wherein the first and second data comprise the same information;
provide an administration user interface that displays the first and second data;
collect, from the administration user interface, permission settings for the first and second data;
store the permission settings on a ledger of a blockchain consent network;
create a system linkage between the first data and second data based on the permission settings;
determine that a remote device is authorized to access the first or second data based at least in part on the permission settings; and
provide, based on the access determination, the remote device with access to the first or second.

12. The system of claim 11, wherein the plurality of data types comprises one or more of personally identifiable information, contact data, identity data, certified claim data, or social media account data.

13. The system of claim 11, the computer system further programmed to:
provide the remote device with executable code via a consent application programming interface (API), wherein the executable code is executable at the remote device to enable presentation of a brand user interface via which the provided first or second data is displayed, and wherein the brand user interface is associated with a partner brand.

14. The system of claim 13, the computer system further programmed to cause the brand user interface to:
display a partner brand reward associated with partner brand; and
display a user score for the user data vault, wherein the user score is associated with a value, to the partner brand, of the first and second data to which the partner brand has access rights.

15. The system of claim 14, wherein the brand user interface further includes a link to redeem the partner brand reward in the form of a virtual currency.

16. The system of claim 13, wherein displaying the data on the administration user interface comprises displaying a first score representative of the value of the first data and a second score representative of the value of the second data.

17. The system of claim 13, the computer system further programmed to combine data collected from the brand user interface into a unified dashboard view, wherein the dashboard view is dynamically updated based at least in part on interaction of the user with the brand user interface.

18. The system of claim 13, the computer system further programmed to store, on the ledger, an authenticated grant of permission by the user for a requesting system associated with the partner brand to access the user data vault, wherein the user receives a reward correlated to a level of permission granted by the user.

19. The system of claim 11, wherein the administration user interface comprises:
an identification of a plurality of partner brands; and
an identification of a respective set of brand-specific data access rights and permission settings associated with each of the plurality of partner brands.

20. The system of claim 11, wherein storing the permission settings on a ledger of a blockchain consent network comprises storing the permission settings in the form of a smart contract.

* * * * *